US 8,286,907 B2

(12) United States Patent
Dohi et al.

(10) Patent No.: US 8,286,907 B2
(45) Date of Patent: Oct. 16, 2012

(54) FLYING ENTERTAINMENT VEHICLE

(75) Inventors: Anthony Paul Dohi, Pasadena, CA (US); Scott Frazier Watson, Marina del Rey, CA (US); Robert Scott Trowbridge, La Canada, CA (US)

(73) Assignee: Disney Enterprises, Inc., Redwood City, CA (US)

( * ) Notice: Subject to any disclaimer, the term of this patent is extended or adjusted under 35 U.S.C. 154(b) by 267 days.

(21) Appl. No.: 12/718,803

(22) Filed: Mar. 5, 2010

(65) Prior Publication Data

US 2010/0282896 A1 Nov. 11, 2010

Related U.S. Application Data

(60) Provisional application No. 61/176,484, filed on May 7, 2009.

(51) Int. Cl.
*B64C 7/00* (2006.01)
*B64C 5/00* (2006.01)
(52) U.S. Cl. ............................. 244/13; 244/2
(58) Field of Classification Search .................. 244/900, 244/902, 903, 904, 153 R, 154, 155 R, 153 A, 244/3, 5, 13, 16, 139, 11, 110 D; 446/57
See application file for complete search history.

(56) References Cited

U.S. PATENT DOCUMENTS

| | | | | |
|---|---|---|---|---|
| 886,122 A * | 4/1908 | Guthrie | ........................... | 244/72 |
| 3,618,877 A * | 11/1971 | Peters | ........................... | 244/55 |
| 4,901,945 A | 2/1990 | Hodgson | | |
| 5,044,576 A * | 9/1991 | Inada | ........................... | 244/13 |
| 7,048,227 B2 | 5/2006 | Towley, III | | |
| 8,091,822 B2 * | 1/2012 | Boyce | ........................... | 244/13 |
| 2008/0313937 A1 * | 12/2008 | Boyce | ........................... | 40/212 |

* cited by examiner

*Primary Examiner* — Timothy D Collins
*Assistant Examiner* — Brian M O'Hara
(74) *Attorney, Agent, or Firm* — Marsh Fischmann & Breyfogle LLP; Kent A. Lembke

(57) ABSTRACT

An apparatus for use as a flying entertainment vehicle. The apparatus includes a lift system, such as a parawing, that is inflated by air to generate lift and further includes a vehicle frame attached to the lift system such as by suspension lines that also space the lift system apart from the vehicle frame. The apparatus includes a thrust assembly supported on the vehicle frame that is operable to propel the vehicle at a flight speed at which the lift system is operated, e.g., the parawing is inflated, to generate lift to suspend the vehicle frame above the ground. The apparatus includes show elements that may be supported on or by the vehicle frame and be configured to be lift neutral. The show elements function to distract observers away from the lift system such as by appearing to provide the lift or features that cause the vehicle frame to fly.

19 Claims, 14 Drawing Sheets

FLYING ENTERTAINMENT VEHICLE

CROSS-REFERENCE TO RELATED APPLICATIONS

This application claims the benefit of U.S. Provisional Application No. 61/176,484 filed May 7, 2009, which is incorporated herein by reference in its entirety.

BACKGROUND OF THE INVENTION

1. Field of the Invention

The present invention relates, in general, to aircraft including ultralight aircraft, and, more particularly, to a flying entertainment vehicle (or powered parawing aircraft) including a lift system such as a parawing, a vehicle frame suspended below and lifted in flight by the lift system, and one or more show elements mounted on the vehicle frame that are configured to appear to an observer to provide or affect flight of the flying entertainment vehicle while being designed to be substantially lift neutral (e.g., providing more drag than lift for the frame) in function.

2. Relevant Background

Mobile entertainment platforms are either stationary when operating or operate on slow moving ground vehicles such as a float in a parade. This is generally the case because entertainment operations often include moving and animating vehicle components and attachments including animatronics, and the characteristics of these components and attachments often are inconsistent with the safe and controlled operation of a fast moving vehicle. Moreover, many vehicles such as aircraft move at speeds that are undesirable for presenting an entertaining show or for good story telling (e.g., with characters and show elements presented on such fast moving vehicles). Also, visually interesting effects including animated movement often conflict with the safe and controlled operation of a vehicle. For example, a moving character can change the center of gravity or other operating characteristics of a fast moving vehicle, and entertainment such as parades and shows at theme or amusement parks has been limited to slow moving or float-type vehicles.

For these and other reasons, it has typically been unheard of to use a flying vehicle as a storytelling platform. Specifically, flying vehicles or aircraft such as planes, jets, rockets, parachutes, balloons, and the like have very strict aerodynamic constraints that make them unlikely candidates for use in many entertainment applications. For example, operators of airplanes are very careful not to alter the shape or functionality of any exterior portions of the airplane as it would undesirably alter its aerodynamic or flying characteristics such as by increasing or decreasing lift or simply changing control of the airplane. More typically, steps such as deicing an airplane are taken to ensure that the outer surfaces of the airplane body includes only functional components or those that assist in the flying operations of the airplane and other aircraft.

In many cases, flying vehicles move far too fast for use in many shows such as when powered with propellers, jets, and rockets. Hence, while "flyovers" are a part of many special events such ball games, the aircraft itself is not decorated, animated, or otherwise modified for entertainment purposes because it is moving too fast for use in a storytelling situation or in entertainment venues where a slow moving vehicle is desired. Slower moving aircraft such as balloons, small planes, and the like are further constrained because their weight carrying ability and aerodynamics are typically considered insufficiently robust to accommodate the significant modifications that may be useful for adding entertainment or show elements. In general, aircraft are built to look and act or function like aircraft, and their aerodynamic elements are purposefully and uniformly made visually apparent to all that see them (e.g., an airplane flies because it includes fixed wings that provide lift when jet engines that provide forward thrust and so on).

Accordingly, a need exists for an entertainment platform that can fly safely and controllably while providing a visually interesting experience for observers.

SUMMARY OF THE INVENTION

It was realized there are many situations where an entertainment experience could be enhanced by providing a flying entertainment vehicle or platform in which the method of lift and/or thrust (aerodynamic lift system that causes the vehicle to fly) were disguised or hidden. Further, it was realized that it may be useful to provide show or entertainment elements on such a vehicle or platform that were not provided for aerodynamic functionality (and, in some cases, hinder flight by adding drag) but, instead, to provide a visually interesting effect such as to provide an animatronic character or the like. For example, many theme parks would benefit from having characters that have the ability to fly (e.g., an animated or other movie with a flying dragon, a fairy, a super hero, and so on) being displayed as flying or providing part of a storytelling experience by flying.

In the past, flying characters were typically suspended in the air using motor-controlled cables or a boom, which severely limited the character's range and direction of travel and prevented observers from truly believing the character could fly (little or no suspension of disbelief). Additionally, real estate or space in many entertainment venues such as theme parks is scarce and expensive, causing the inventors to look toward the sky for providing entertainment. Other than firework shows, there are few attractions that utilize the sky above an entertainment venue such as a theme or amusement park. Hence, aside from being a unique experience for a park visitor, a self-contained flying attraction such as a flying entertainment vehicle requires very little infrastructure and is easily provided over nearly any part of the park (e.g., the storytelling experience or entertainment experience can be moved and taken to the location of visitors or guests of the park).

Briefly stated, the present invention involves a flying entertainment vehicle having a vehicle body and an aerodynamic lift system coupled to the body (e.g., a vehicle frame suspended from a parawing or other parafoil). The lift system implements control surfaces (e.g., portions of the parawing canopy) operable to controllably direct the vehicle body and affect lift, such as when the vehicle reaches a takeoff and flying speed (e.g., in response to thrust provided by a motor-driven propeller mounted on the vehicle frame). A control system operates the aerodynamic lift system to control the control surface. The control system may be adapted to allow remote control (e.g., a remotely-piloted vehicle) operating control cables and/or components and/or may involve a pilot seated within the vehicle frame operating control cables (or wires, lines, or the like) extending from the vehicle frame to the parawing.

Visually perceptible show elements are coupled to the vehicle body or frame and/or aerodynamic lift system and are operable, in some embodiments, during flight to distract an observer's attention away from the aerodynamic lift system and direct the observer's attention to the visually perceptible show elements. For example, a character's body may extend from or about the frame and include one or more show elements such as wings, a tail, a head, and so on that cause an observer to believe the vehicle is flying due to the inclusion of these show elements. In practice, though, the show elements such as a tail, wings, and a head are designed to be lift-neutral (e.g., to not significantly affect flying operations of the flying entertainment vehicle such as by substantially only providing parasitic drag (e.g., drag with little or no lift)). A design goal may be to make the show elements as aero-dynamically passive as possible such that these elements produce little or no lift (especially uneven lift). Also, the show elements typically are designed to not produce uneven torques (even if this were created via parasitic drag). In this document, the term "lift-neutral" is used to convey these aspects but other terms such as non-lifting and the like may used in place of lift-neutral.

More particularly, an apparatus is provided for use as a flying entertainment vehicle or platform. The apparatus includes a lift system that may be inflated by air to generate lift such as a parawing. The apparatus further includes a vehicle frame attached to the lift system. For example, when the lift system includes a parawing, the parawing may be connected to the vehicle frame via a number of suspension lines or risers and may be controlled from a pilot in or on the vehicle frame via a number of control lines extending to the parawing (or its control surfaces). In this way, too, the vehicle frame is spaced apart a distance, defined by the length of the lines, from the parawing or device actually used to provide lift or create flight. The apparatus further includes a thrust assembly supported on the vehicle frame, and the thrust assembly is operable (such as by the pilot) to provide thrust (such as via a propeller mounted at or toward the rear of the vehicle frame) that propels the vehicle at a flight speed at which the lift system is operated, e.g., the parawing is inflated, to generate the lift that causes the vehicle frame to be suspended in flight.

Significantly, the apparatus further includes a number of show elements that may be supported on or by the vehicle frame. The show elements function to grab the attention of observers of the apparatus in flight as they may appear to provide the lift or features that cause the vehicle frame to fly. However, the show elements are substantially lift neutral in that they generally provide more drag on the apparatus than vertical lift (e.g., vertical lift is relatively small if present (i.e., 80 to 90 percent or more of the lift is provided by the lift system)) and are configured to minimize torques as well.

For example, the show elements may include a wing that extends laterally outward from the side of the vehicle frame (or a character body show element used to cover all or parts of the frame), and the wing is configured or adapted to generate greater amounts of drag than lift as the vehicle moves through the air at flight speeds. To this end, the wing may include a rigid forelimb or arm defining a leading edge of the wing and also a webbing or body extending rearward from the arm to a trailing edge of the wing. The trailing edge of the wing is designed to move vertically up and down in response to air flowing over the wing during flight, such that the wing remains substantially lift neutral (e.g., the webbing moves with air flow to avoid generating lift). The wing may include one, two, or more fingers that each extend from a first end that is pivotally coupled or attached to the arm toward a second end that is proximate to the trailing edge of the wing. The webbing or wing body may be a flexible sheet of material that is connected to the fingers and moves relative to the arm with the pivoting fingers (e.g., the fingers may be spaced apart and the webbing may extend between the fingers). The wing may also include a support (such as a tube(s)) within the webbing that extends along and defines/supports the trailing edge of the wing.

The show elements may include other devices that function to distract an observer from the lift system while being lift neutral. In one embodiment, the show elements include a tail assembly that may have an elongated, hollow body formed of a flexible material (such as a fabric sheet(s)), and the body may have an opening proximate to the outlet of the thrust assembly such that air output from the thrust assembly enters the opening and inflates and animates the tail body during flight. The tail assembly may also or instead include an internal support within the tail body, and the internal support may include a spring member that extends along at least a portion of the length of the tail body (such as an elongated leaf spring or the like with a spring constant that is uniform along its length or that may be more rigid near its base or near the vehicle frame). The spring member is configured to restrain movement of the tail body such as by limiting its movement to a back and forth or side-to-side movement within a single plane. However, in some embodiments (e.g., a wood/Kevlar leaf spring member or the like), the spring member may be adapted to exhibit twist, too. In some cases, the magnitude or range of movement as well as the rate of movement may be constrained by the spring member. The tail assembly may include a tip and the internal support may include a pivotal connection assembly between the spring member and tip such that the tip pivots in response to air flow during flight and/or in response to movement of the spring member/tail body. Additionally, the relative wind speed may also be accounted for in designing the spring member/tail body as this will contribute to the animation of the end of the tail. Also, additional links and/or pairs of hinges may be provided to create more motion (e.g., more sinusoidal and/or side-to-side motion of the tail body and/or tip).

Other show elements or apparatus components may be provided to disguise operation of the lift system. For example, the show elements may include a head extending outward from the front of the vehicle frame (or a body mounted over the frame), and the head may be passively animated or actively animated (such as with manual puppeting controls and/or animatronics that may be activated/controlled by the pilot and/or by outboard control devices such as show signals). The apparatus may also include one or more projectors that function to display or project light and/or images onto the lift system during the flight. For example, a projector may be used during a low lighting flight to project (from the vehicle or from the ground) images that cause a parawing canopy to disappear into the background of the sky or to change shape/form. In another example, the parawing may be designed with colors, materials, and/or shape to be disguised (e.g., be more difficult to see in the sky) or to appear to have a differing function (e.g., to be a sign or banner that is pulled by the vehicle frame rather than acting to lift the vehicle frame).

DETAILED DESCRIPTION OF THE PREFERRED EMBODIMENTS

Figure 1:
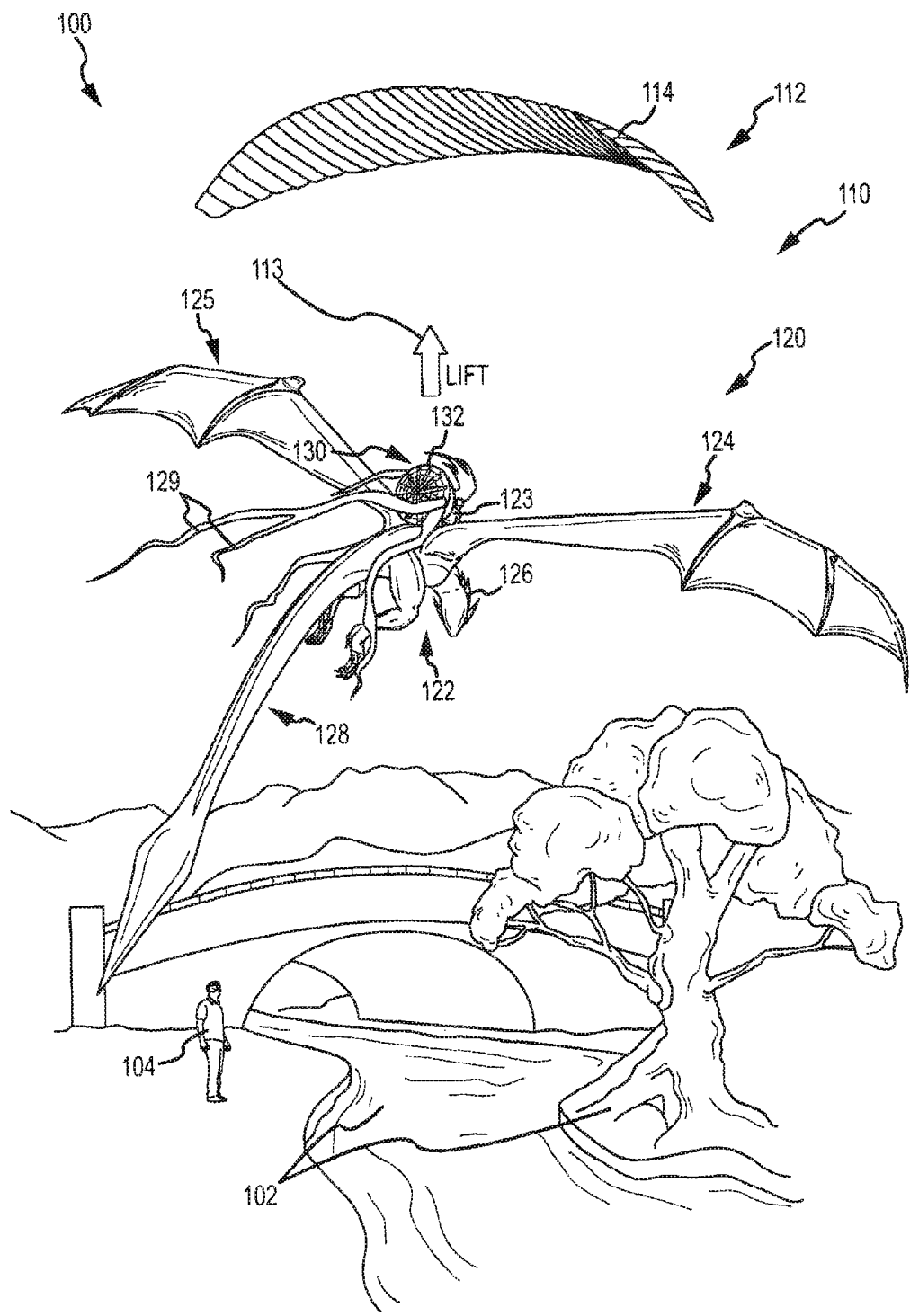
FIG. 1 shows perspective view of an entertainment or show venue (e.g., an amusement park) in which a flying entertainment vehicle or platform described herein is utilized to entertain observers or venue visitors.

The present invention is generally directed toward a flying entertainment vehicle or platform that may be used in an entertainment facility or venue (such as at a theme or amusement park). The following description begins with a general overview of aspects of such a flying entertainment vehicle and then proceeds to more specific descriptions of features that may be provided with particular exemplary embodiments or implementations with reference to the attached figures.

The flying entertainment vehicle may be used to display a dragon or other creature as it flies over heads of observers. To this end, the flying entertainment vehicle may include a vehicle frame providing a cockpit for a pilot and providing a set of controls. The vehicle frame may also include a thrust assembly (e.g., a motor-driven propeller) to propel the vehicle at a takeoff and flying speed. The vehicle frame may then be disguised with a set of show elements such as a character body provided about the frame to hide or disguise the pilot and to hide/disguise the thrust assembly. The show elements may also provide one or more components that appear to be lift-providing components but that are actually lift neutral in that they do not typically provide vertical lift (or provide less lift than drag).

For example, the show elements may include a character body of a dragon or other winged creature and the show elements may include wings that extend outward from the vehicle frame. These may appear to an observer to provide lift to the flying entertainment vehicle but be configured appositely so as to "move" or flutter in the wind while not providing any appreciable lift. The lift is provided by a lift system attached to and separate from the vehicle frame such as including a parawing with its canopy inflated above the vehicle frame and control lines (as well as suspension lines) extending to the vehicle frame such that the pilot may direct the flying entertainment vehicle.

The use of a lift system or assembly with a parawing or other parafoil and observer-distracting show elements provides a number of capabilities. The engineering required to create a flying character is greatly abbreviated. For example, the parawing acts as the lifting body completely independent of the aerodynamics of the character's body, wings, head, tail, and/or other show elements. The character would not be range constrained as would be the case with a tethered flying platform. Parawings inherently fly relatively slowly (e.g., 20 to 35 miles per hour), which is well within the parameters typically set for a high quality show or storytelling event. Parawings have evolved into very safe and straightforward methods for flight and are designed with very slow stall speeds and a method for recovery from stall conditions.

Further, even in embodiments where the parawing cannot be completely hidden from view of an observer, one or more of the surfaces of its canopy may be made in a color allowing it to blend into the sky tones (e.g., a color matching the sky) while in other cases the show is performed at night such that the dark hides the parawing or the canopy is formed of translucent materials. The show elements including the character body and its wings may also be styled in such an abstracted way so as to be engaging to the viewer (e.g., attract a viewer's attention away from the true lifting system provided in some cases with a parawing) while still conveying a sense of being alive (e.g., wings, tails, head, and so on that move such as to appear to be providing the lift or directing the vehicle in a particular direction). In some cases, the lift system uses lighter than air aircraft such as blimps and hot air balloons in place of a parawing (e.g., a self-inflating flexible wing).

The show elements may include character features such as a tail, wings, and/or a head that may be passively animated or these features may be animated manually or in a more automated manner. For example, in one embodiment, the show elements include a tail that is inflated by prop wash or air output by a propeller and is configured to move in a serpentine manner within a horizontal plane to provide little or no vertical lift. Dampers or motion control elements may be provided to limit speed and/or range of movements. Similarly, wings may be included in the show elements that have a webbing or body that may be lifted up and down by the air flowing over the wings without creating substantial vertical lift (e.g., a trailing edge that is able to move in a relatively unrestrained manner so as to avoid providing lift or changing the aerodynamics of the overall flying entertainment vehicle).

The character animation may be motor-controlled, pneumatically controlled, or may be simplified such that the character's articulated joints are manually puppeteered. In the manual arrangement, the character may be viewed as a suspended flying puppet while in the motor-controlled version the character would be an animatronic figure (e.g., pneumatic-driven and/or motor-driven links and/or appendages). Additionally, it may be useful to have passively animated motions in the figure as discussed above with or without the manual/animatronic portions (e.g., the head may be operated by a puppeteer while the tail and/or (in some limited situations) the wings are passively animated). The passive movements may be driven by the force of air as the figure flies or changes direction and/or altitude so as to impart forces upon a limb or limbs. However, in some embodiments, the show elements may include a figure or character on the vehicle frame that has no animated parts (e.g., a flying mannequin).

The animatronic aspect of the show elements may include any robotic device, and these show elements may be suspended from the parawing (e.g., attached to and controlled from the vehicle frame by the pilot or other controls). For example, the animatronic components may include a computer and software system (e.g., a CPU and memory storing code devices such as show routines or other control programs that operate to generate and transmit control signals), power electronics, motors, a battery pack(s), mechanism linkage, pneumatic components, and/or an outer surface (or skin or shell).

A flying entertainment vehicle or platform has several competing functional goals, not the least of which is continuously maintaining aerodynamic stability and control while flying. One reason that flying vehicles have not been used for entertainment purposes is that almost any modification to a flying vehicle negatively impacts its aerodynamics. This is particularly true for modifications such as addition of show elements that move during flight. For this reason, aircraft almost uniformly have fixed symmetrical shapes. Aircraft are so ubiquitous now that observers expect to see aircraft with fixed symmetrical shapes and have a natural understanding of vehicle forms that appear aerodynamically stable.

The inventors have found that visual interest and excitement is created by intentionally violating these implicit expectations about aerodynamic stability in a flying vehicle. For example, vehicles that appear to have wings or body parts of natural or mythical beasts such as birds or dragons are entirely unexpected. More generally, the inventors have found that an exciting and useful flying entertainment vehicle can be made anytime a flying apparatus can be modified to visually appear to violate an observer's expectations about aerodynamic stability while at the same time maintaining actual aerodynamic stability, safety, and control of the vehicle.

Actual implementations may involve straightforward disguise of the aerodynamic lift system for a particular vehicle. Specific embodiments of the present invention are based on modified parawing-type vehicles with a ram air-filled or inflated parafoil or parawing that is separated or spaced apart from a main vehicle body or frame by support and control lines. The parawing itself and/or the support and control lines can be artfully disguised by making them partially transparent or colored so as to match a sky background. Alternatively, these aerodynamic lift elements may be colored in trompe l'oeil fashion to appear as if they are something else, such as a flock of birds, a sign displayed by the vehicle suspended below, and/or other show elements that distracts an observer from the aerodynamic qualities and true performance of the aerodynamic lift system. More sophisticated disguise might be possible with dynamic video projection onto the aerodynamic lift system using projectors mounted in/on the vehicle body or ground-based projection systems that track the vehicle and project desired images onto the aerodynamic surfaces (e.g., onto the lower side of the canopy of a parawing or the like). These techniques are often suitable not only for disguising the aerodynamic lift system but also the vehicle body to which the lift system is attached. Such projection may be particularly useful in low light conditions such as during a nighttime show.

The present invention contemplates show elements including static and/or animated attachments or extensions from the vehicle body that are not aerodynamically essential to the vehicle (e.g., serve show functions or display functions but do not provide vertical lift). In many cases, the show elements would be of the type that by themselves would negatively impact aerodynamic performance by increasing weight without significant lift, by creating additional drag during flight, and/or by creating non-uniform lift/draft in flight such as might occur with moving or asymmetrical show elements mounted on the vehicle body. These show elements can take a variety of forms to meet the entertainment goals/functions of a particular application but are characterized in accordance with the present invention as elements that function to visually disturb an observer's expectations about the aerodynamics of the vehicle they are observing. This can be accomplished quite simply by distracting the observer's attention from the aerodynamic lift system such as by providing large dragon wings extending outward from the suspended vehicle body or frame, as the wings would suggest to the observer that the dragon wings are actually allowing the vehicle to fly rather than the less apparent and spaced apart lift system. More compelling implementations may be possible by making the show elements in a way that creates an appearance to observers of an improbably large and/or heavy flying object or heavy extensions (e.g., a long tail that moves and appears to be relatively heavy). The present invention takes advantage of an observer's implicit expectations of what should and should not be able to fly to create an illusion that violates those implicit expectations.

The show elements function independently or in cooperation with the aerodynamic lift system and vehicle body to distract the observer and/or to disguise the aerodynamic lift system. Distractions include elements such as improbably large body parts, lighting, and/or other visual effects that draw the observer's attention away from the aerodynamic lift system. Disguises include coloring, lighting, or other visual effects that hide all or part of the aerodynamic lift system (e.g., the body or frame may support a motor-driven propeller and the body or frame may be configured to shield the view of the propeller such that an observer).

In particular implementations, the flying entertainment vehicle includes control systems that operate to independently receive piloting commands and show control commands. The piloting commands may affect the direction and lift of the vehicle. The show control commands may affect the visually perceptible show elements. The control system may combine the piloting and show control commands to cooperatively manipulate the aerodynamic lift system and the show elements so as to implement the show commands without adversely affecting aerodynamic stability.

FIG. 1 illustrates a flying entertainment vehicle or platform 100 of one embodiment of the invention. The vehicle 100 includes a lift system 110 and a vehicle assembly 120. The vehicle 100 is operable as shown to fly over a venue 102 such as grounds of a theme park to provide a storytelling or other entertaining visual effect to one or more observers or venue guests 104. It is desirable that the guests 104 have their vision or line of sight drawn to the vehicle assembly 120 and away from the lift system 110 such that they may allow themselves to believe the vehicle assembly 120 flies on its own (or provides the lift 113 to keep it afloat over park/ground 102).

In this example, the lift system 110 may include a parawing 112 that is attached to the vehicle assembly 120 via suspension lines and directed/controlled via control lines extending to the vehicle assembly 120. The lines purposely are not shown in the vehicle 100 so as to indicate that in use such lines are difficult to see by observers 104 or are nearly invisible. Further, the parawing 112 may be inflated during flight as the canopy 114 or its cells undergo forces from moving air as the vehicle assembly 120 reaches takeoff and flight speeds (e.g., 25 to 30 mph or the like for many parawings). At this point, the parawing 112 applies a lift 113 upon the vehicle assembly 120 to create flight for the flying entertainment vehicle 100 including the vehicle assembly 120. The canopy 114 may be fabricated to further disguise it from view by the observers 104 such as by forming it of translucent material, by coloring it or its underside a color that is difficult to see or that blends into the sky, and/or by providing show elements on it to disguise its lift-generating functionality (e.g., paint it as a sign/banner such that it appears to be pulled by the vehicle assembly 120 rather than its lifting 113 of the assembly 120).

The vehicle assembly 120 includes a body 122 that may include a character body/torso over a frame with a seat/cockpit for a pilot 123. To provide forward thrust, the vehicle assembly 120 may include a thrust assembly 130 with a propeller supported and spinning within a prop cage 132. The prop cage 132 may be at least partially hidden by the body 122 from observers 104.

To distract the observers from the lift assembly 110, the vehicle assembly 120 includes show elements including wings 124, 125 extending outward from the body 122. The wings 124, 125 may be configured to distract the observer with articulation of the webbing/body or other portions so as to move to appear to actively provide lift 113 while, in practice, providing no or little vertical lift (e.g., lift neutral with wind/air-induced, passive articulation of the trailing edge of the wing webbing while the shoulder and leading edge and/or fingers remain relatively steady or non-moving during flight). The show elements may also include a head 126 extending from the front of the body 122 and a tail 128 extending outward from the rear of the body 122. These show elements 126, 128 may be rigid (e.g., a mannequin embodiment), be passively articulated such as by inflation of the tail body 128 via the prop wash from thrust assembly 130 (e.g., a side-to-side movement in response to airflow), and/or be puppeted via motor-driven or manual control linkages. Preferably, the head 126 and tail 128 are designed to be relatively lift neutral when moved so as to avoid changing aerodynamic characteristics of the vehicle assembly 100 (e.g., provide relatively uniform parasitic drag or the like). The show elements may also include streamers or banners 129 that are pulled behind the body 122 and that may be allowed to flutter freely without restraint so as to provide an eye-catching feature that draws the attention of the observer (e.g., draws attention away from the vehicle lifting parawing 112) to the vehicle assembly 120.

Figure 2:
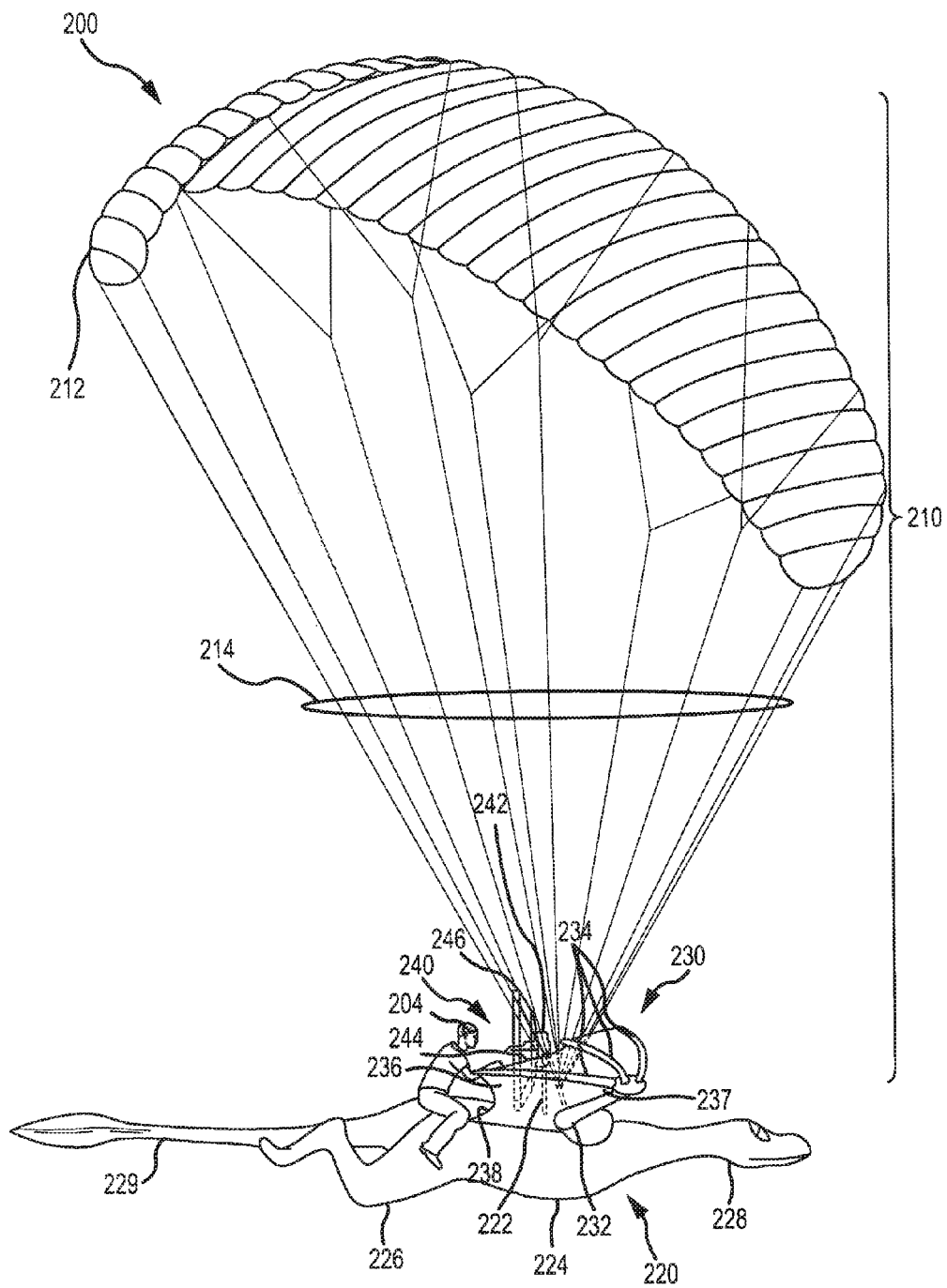
FIGS. 2 and 3 show side and front views, respectively, of a flying entertainment vehicle or platform during flight showing use of a lifting system that may include a parawing or airfoil apart from a vehicle frame to provide lift while show elements function to provide an illusion of generating lift while being lift neutral.
Figure 3:
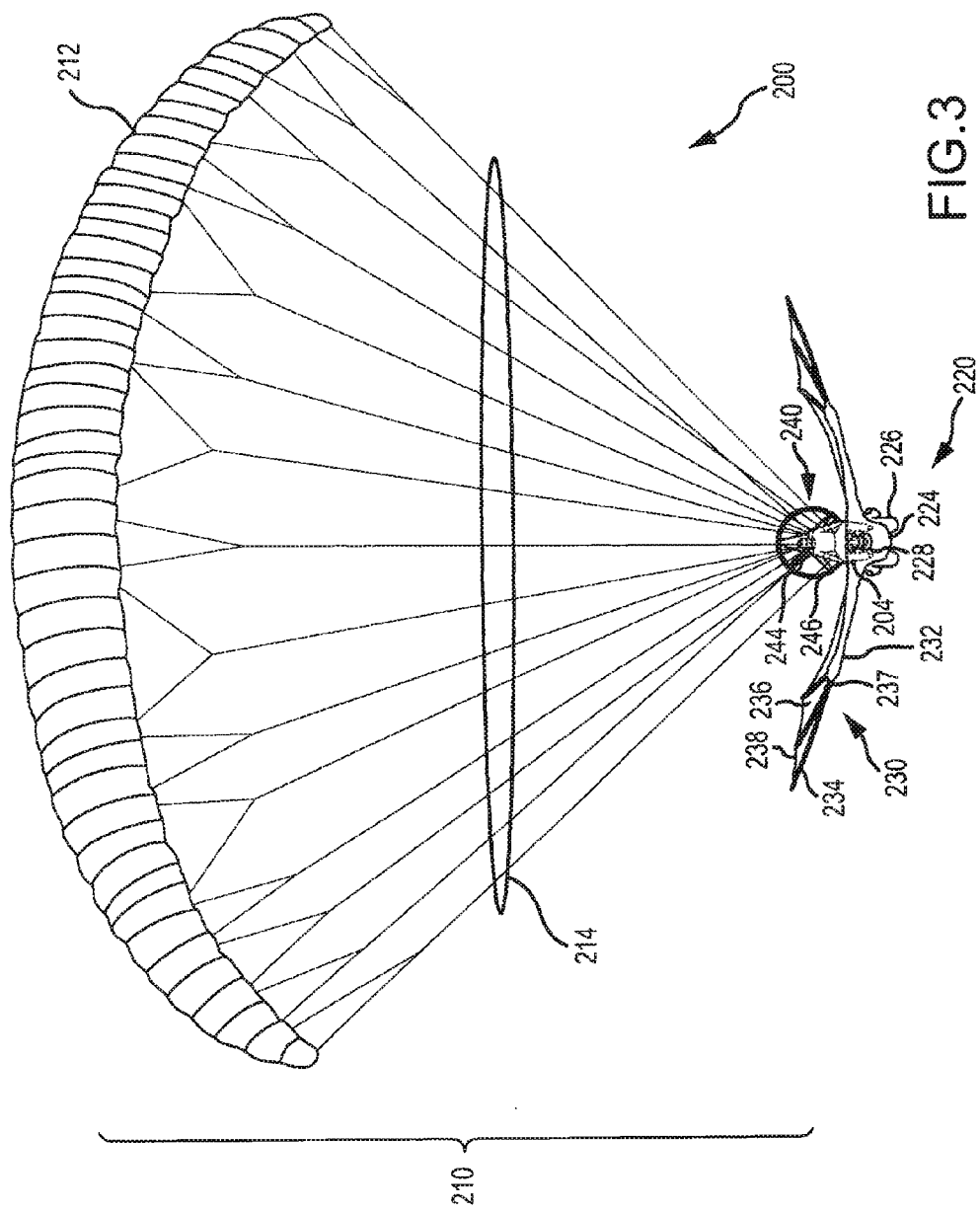

FIGS. 2 and 3 illustrate side and front views, respectively, of another embodiment of a flying entertainment vehicle 200. As shown, the vehicle 200 includes a lift system 210 that includes a parafoil or parawing 212 attached to a vehicle assembly 220 (e.g., to a frame 222) via flexible riser lines 214. The vehicle 200 is shown as it would appear in flight with the parawing 212 inflated and using its generated lift to suspend the vehicle assembly 220 via flexible suspension and control lines 214. The parawing 212 may generally take any form well known in the art of powered ultralight aircraft that make use of inflated parafoils or parachutes to fly a suspended vehicle (such as a trike, watercraft, snowmachine, or the like carrying a motor-driven propeller or other thrust-proving device). Generally, the parawing 212 may be any parafoil or nonrigid (e.g., textile body or canopy) airfoil that may include an aerodynamic cell structure that is inflated by the wind, e.g., ram-air inflation forces or inflates the parafoil 212 into a traditional wing-like shape that lifts the parafoil 212 and attached vehicle assembly 220 off the ground when the vehicle assembly 220, and attached and towed parawing 212, reaches takeoff and flight speeds.

The vehicle assembly 220 includes a structural frame 222 to which at least the suspension components of lines 214 are attached to allow the lift system 210 to carry the vehicle system 220 in flight as shown. A pilot or rider 204 is shown at least partially on the outside of the frame 222, e.g., to provide a show element in this embodiment as the pilot appears to be riding the other show elements (i.e., to be a dragon rider in this case). The pilot 204 would typically be able to hold or manipulate the control components of the lines 214 (which may not be clear from the figures).

In the embodiment 220, a portion of the show elements may be relatively rigid or mannequin-like. For example, the show elements may include a figure or character with a body 224 covering all or portions of the vehicle frame 222. The show elements may further include legs 226, a neck and head 228, and a tail 229 each of which extends outward from the body 224 and vehicle frame 222. In this embodiment, each of the show elements 226, 228, 229 does not move (e.g., is a static figure set made up of a frame structure and/or an outer shell) and functions to provide character/figure features that may distract an observer of the vehicle 200 while typically only providing parasitic drag (e.g., drag with little or no lift functionality). These show elements 226, 228, 229 may in some embodiments, though be formed as an animatronic figure set, a puppeted figure set, and/or a passively animated figure set, with controls (as needed) extending into the frame 222 for activation in response to control signals (e.g., operated outboard or by onboard devices that generate the control signals) and/or in response to control actions taken by pilot 204. For example, the pilot 204 may manually manipulate the head 228 or tail 229 to provide life to the vehicle assembly 220 and its show elements/character or may activate one or more animatronic movements such as a programmed or scripted action that may be controlled via CPU, power electronics, motors, power devices, pneumatic devices, controls, and mechanism linkages in the legs, 226, head 228, and/or tail 229.

The show elements may also include a wing assembly 230 that utilizes passive animation to bring life to the character/figure and to distract an observer from lift system 210 with moving parts. Specifically, in this example, the wing assembly 230 may include a pair of wings formed with a forelimb or leading edge structure 232 that extends outward from the frame 222 and/or body 224 a distance to define a wingspan (e.g., from a shoulder to a wingtip). Each of the wings of the assembly 230 may also include 2 to 5 or more, spaced-apart fingers or limb bone structures 234 extending rearward from the forelimb or leading edge structure 232. Typically, the fingers 234 along with the forelimb 232 are formed of relatively rigid materials such as a lightweight metal tubing or a hard plastic tubing or rod such that they have minimal flexing during flight (e.g., have a relatively fixed drag characteristic to facilitate control over the vehicle 200). To provide animation, the webbing or body 236 may be a fabric or textile sheet that is fixed at a leading edge 237 to the forelimb 232 and/or one or more fingers 234. However, at a trailing edge 238, the webbing or body 236 is unrestrained such that it may be moved at least up and down relative to the plane of the wing (or webbing 236) by air flowing over the wing assembly 230 during flight. In this manner, the webbing 236 flutters so as to cause the wings of assembly 230 to appear to be flapping and/or providing lift to the flying entertainment vehicle 200 while the wing assembly 230 is actually nearly lift neutral.

Forward thrust for the vehicle 200 is provided by thrust assembly 240. As with a conventional paraglider, the thrust assembly 240 may include a motor 242 (e.g., a gas powered motor or the like) that is used to drive a propeller 244. The propeller 244 moves air to provide a rearward thrust (e.g., a thrust force generally parallel to the plane of the wings in wing assembly 230 or along the axis of the tail 229) that would move the vehicle assembly 220 up to a takeoff speed to inflate the parawing 212 (e.g., the frame 222 would also typically include wheels for a ground takeoff, skis for a snow/ice takeoff, and/or pontoons/skis for a water takeoff). A cage 246 may be provided about propeller 244 for safety and to avoid damaging lines 214. The body 224 and/or other show elements (such as wing assembly 230) may be configured so as to disguise or hide the thrust assembly 240 from an observer below and/or to the side of the flying entertainment vehicle 200.

Figure 4:
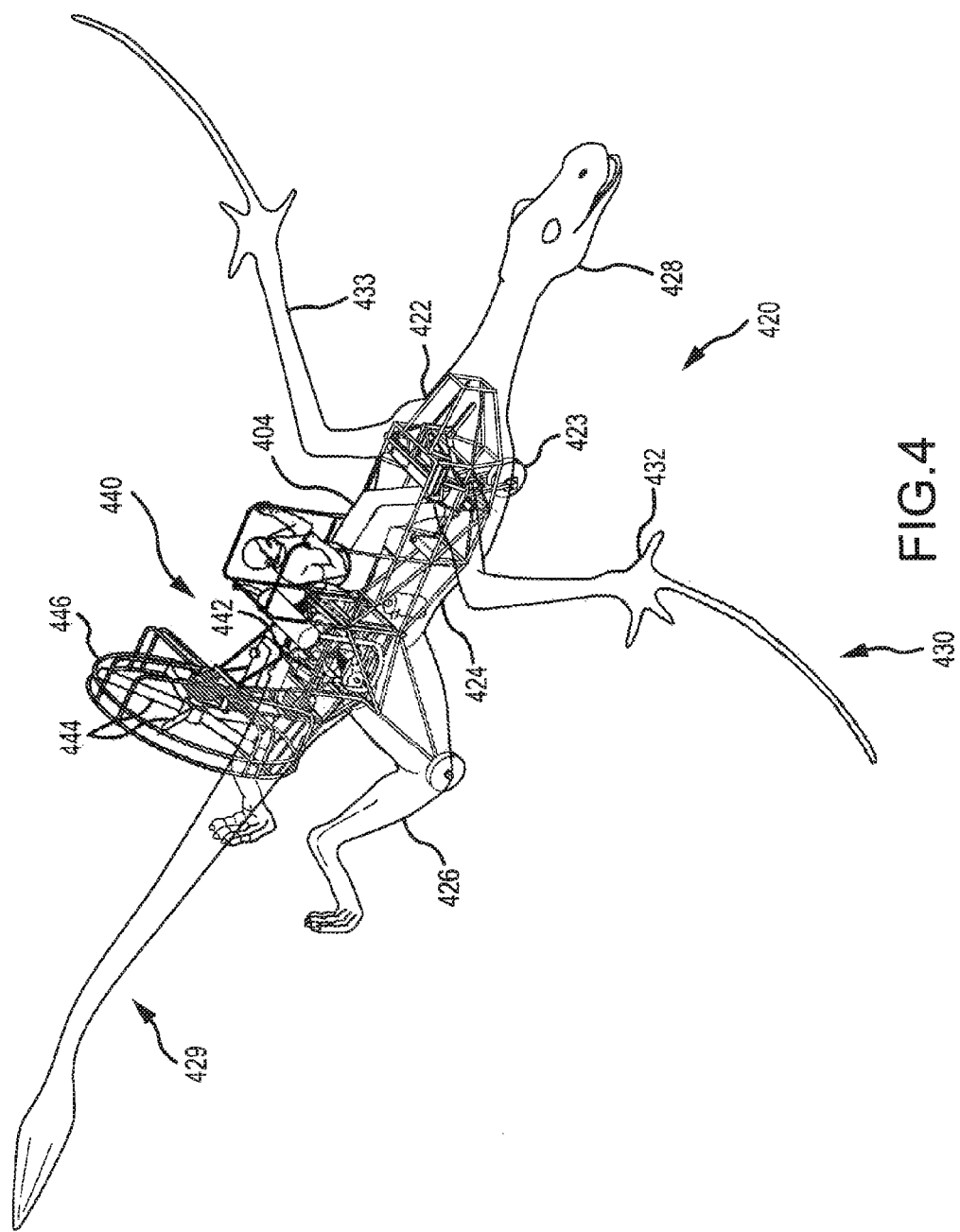
FIG. 4 shows a top perspective view of a vehicle assembly illustrating the mounting of show elements along with a thrust assembly on a vehicle frame prior to addition of webbing or a sail portions of illustrated show wings (a wing that is designed to effectuate operations of a wing without actually providing significant lift)
Figure 5:
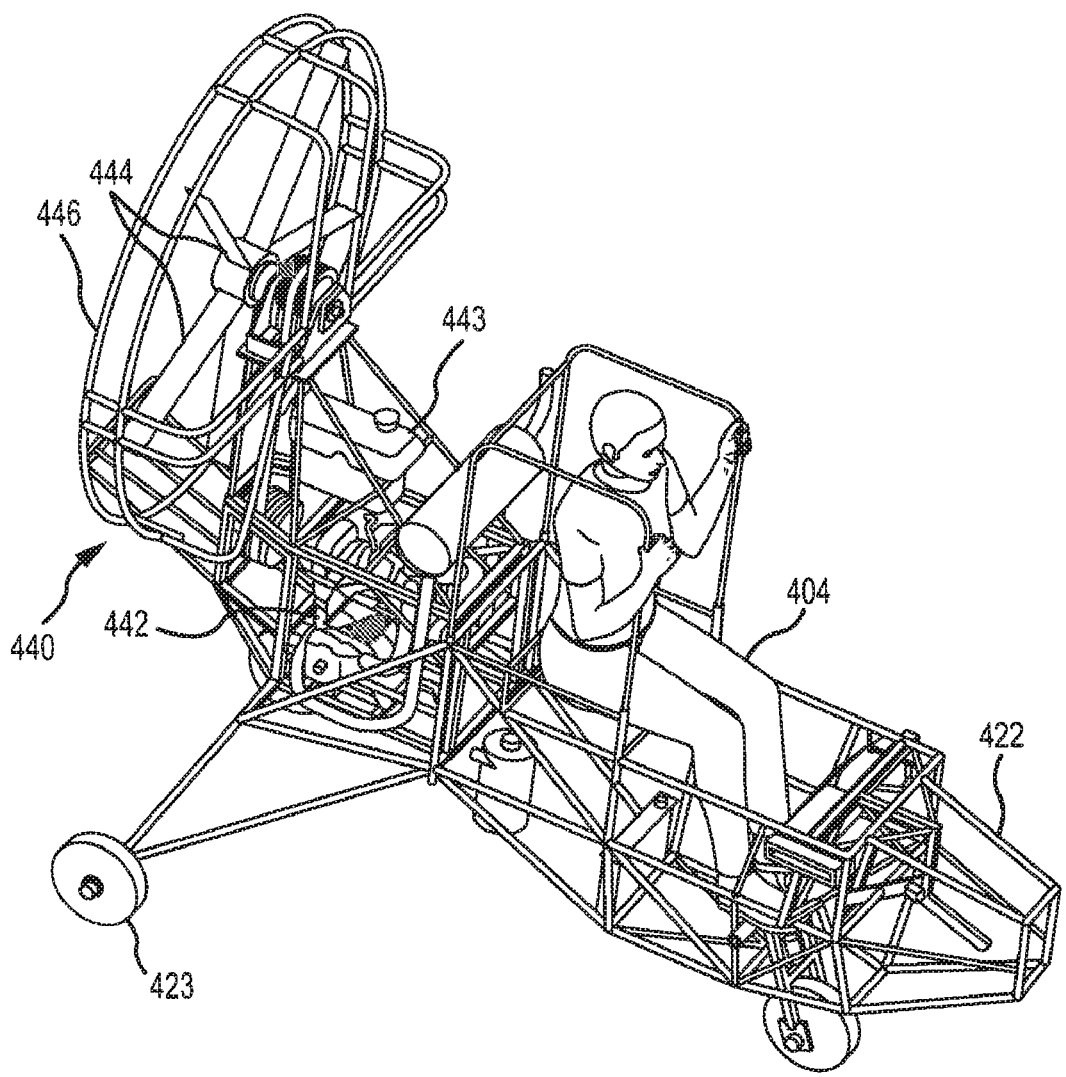
FIG. 5 illustrates the vehicle frame and thrust assembly of the vehicle assembly of FIG. 4 in more detail.
Figure 6:
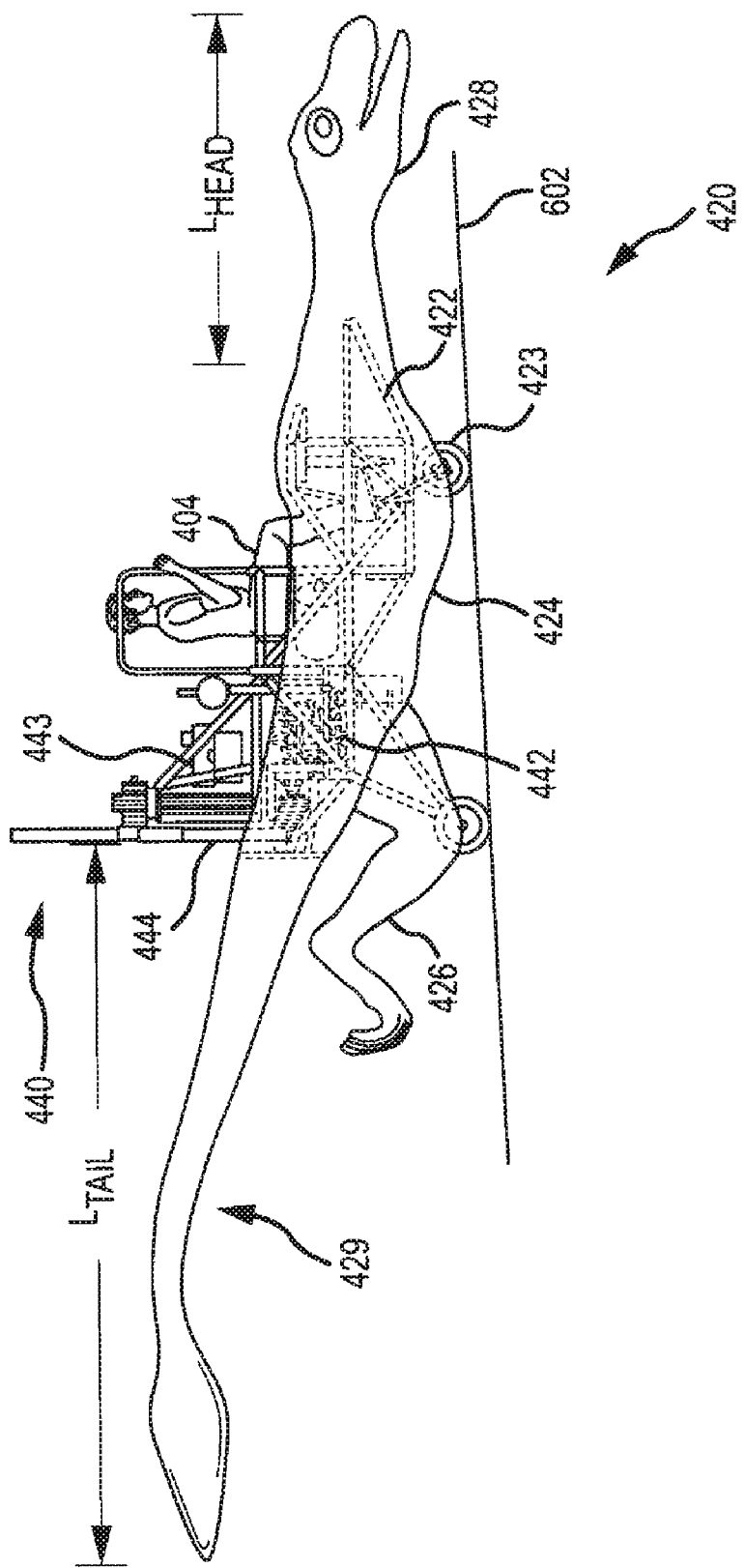
FIG. 6 is a side view of the vehicle assembly of FIG. 4 prior to mounting of the show wings on the body covering or surrounding portions of the vehicle frame.

FIGS. 4-6 illustrates an embodiment of a vehicle assembly 420 that may be used with a lift system as described above to provide a flying entertainment platform of the invention. As shown, the vehicle assembly 420 includes a frame 422 that defines a cockpit in which a pilot or operator 404 may sit so as to control the lift system (not shown) as well as the thrust assembly 440 (e.g., throttle the motor 442) and (in some embodiments) show elements such as animatronic components (e.g., head 428). To facilitate takeoff and landing from ground 602, the frame 422 includes three wheels 423 to allow the vehicle assembly 420 to roll along the ground 602.

A thrust assembly 440 is positioned within and/or mounted to frame 422 to move the vehicle assembly 420 at speeds needed to fill a parawing (not shown) for takeoff and flight (e.g., at about 20 to 30 mph or the like). The thrust assembly 440 may include a motor 442 that may be a gas-powered motor or engine with a gas tank 443 provided on or in frame 422. The motor 442 may turn belts (not shown) to rotate propeller 444 to move a volume of air and provide motive thrust for vehicle assembly 420. An optional blade cage 446 may be provided on frame 422 partially enclose propeller 444 to minimize risks of the paraglider risers becoming entangled during takeoffs and landings and for safety purposes.

The vehicle assembly 420 includes a number of show elements. For example, the show elements may have a function of drawing an observer's attention away from a lift system toward the vehicle assembly 420 and/or a function of providing the illusion of generating lift or flying abilities while minimizing detractions from aerodynamic characteristics of the flying entertainment vehicle (e.g., parasitic drag without or with minimal lift changes due to movements). In this embodiment, the show elements include a character or figure body or torso 424 that extends over or covers a large percentage of the frame 422. This pilot position permits false pilot legs to be hung over the sides of the body (e.g., dragon) to make it seem as if the pilot is saddled on the back of the flying animal/creature (when the pilot's legs are actually inside the frame controlling the nose wheel and pedal(s) for actuating (e.g., via pneumatic or other controls) the wing (or other component) movement/flapping). The cockpit for the pilot 404 may be substantially within the body 424 such that the pilot 404 is difficult to see from the ground 602 when the vehicle assembly 420 is flying. The show elements may also include legs 426 extending outward from the body 424 as well as a neck and head 428 extending a distance, $L_{Head}$ (such as 40 to 80 inches or the like when the body 424 has a length in the range of 60 to 100 inches), from the front of the body 424 and a tail 429 extending a distance, $L_{Tail}$ (such as 100 to 180 inches or the like), from the rear of the body 424. The tail and neck 428, 429 may be static figures in this embodiment or be puppeted via manual or animatronic-type controls and mechanism linkages (not shown).

In the vehicle assembly 420, the show elements may also include a wing assembly 430 made up of a pair of wings 432, 433 that extend outward from the sides of the torso or body 424. The wings 432, 433 may be formed to be generally rigid or to have a small amount of flex during flight (under forces of air during flight). In this assembly 420, the wing assembly 430 is a static component of the figure (of the dragon in this case) and is used to provide the illusion of a gliding creature or figure rather than one that is generating lift by flapping or moving its wings (e.g., flying or soaring similar to an eagle or the like). The lack of "feathers" or a body/webbing similar to that found in a bird's wings makes the wings 432, 433 relatively lift neutral, which is generally desired for a vehicle assembly and its show elements.

Figure 7:
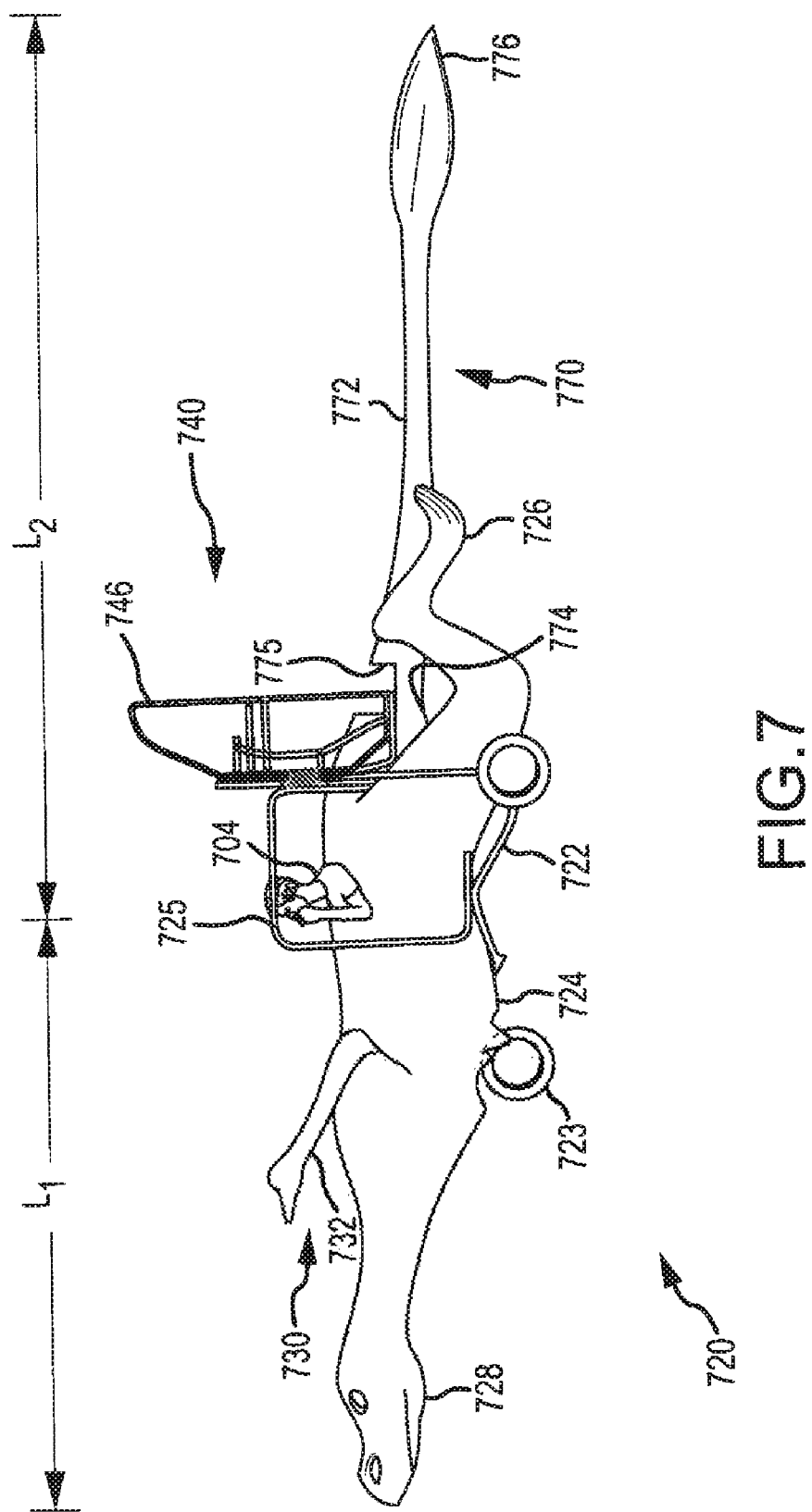
FIG. 7 is a side perspective view of another embodiment of a vehicle assembly similar to that shown in FIG. 4 but further showing use of an inflatable tail assembly (or tail sock) to provide a show element that functions to move in response to operation of the thrust assembly while minimally affecting lift.
Figure 8:
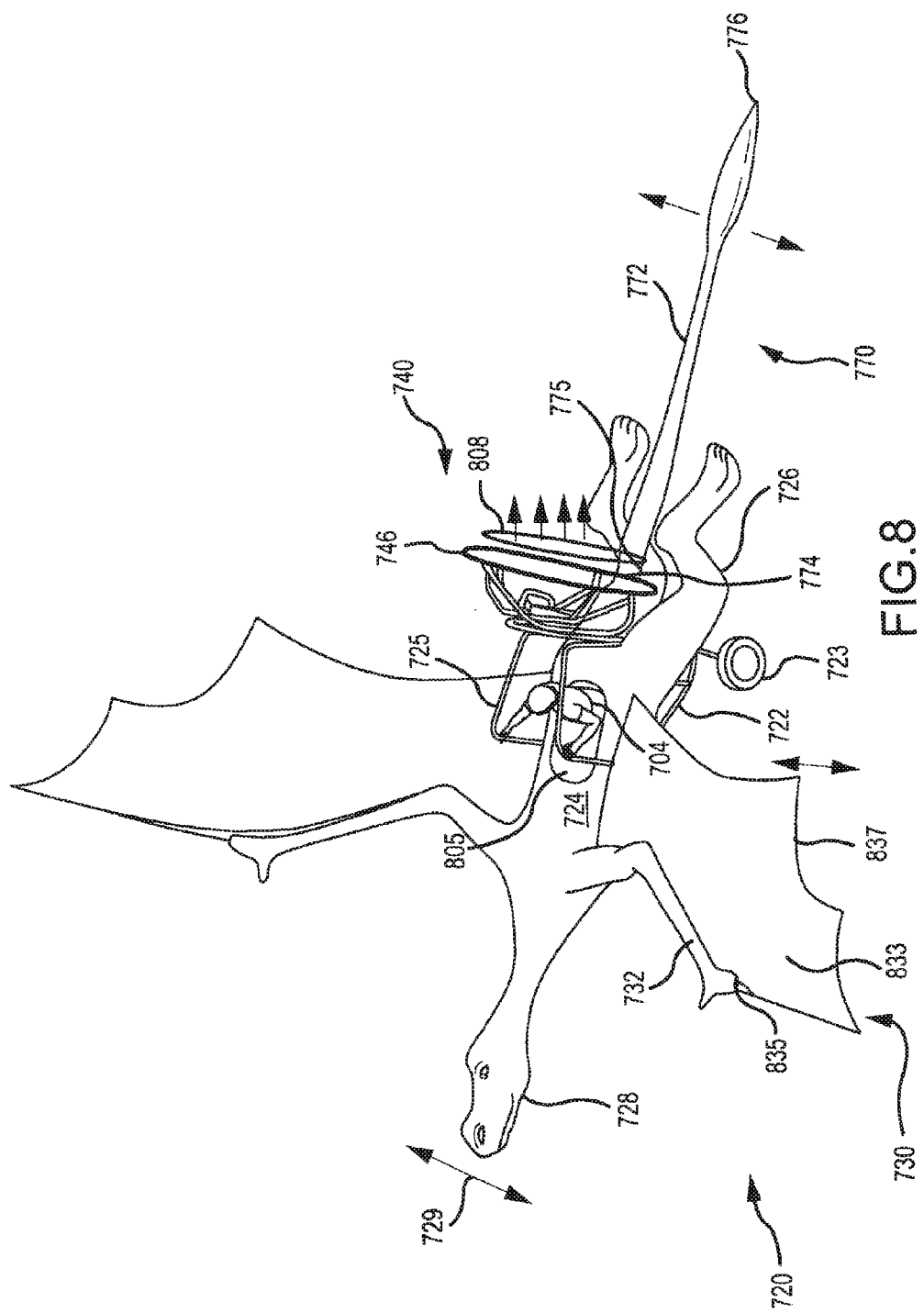
FIG. 8 illustrates a top perspective of the vehicle assembly of FIG. 7 further showing addition of wing bodies or webbings that are flexible or vertically unrestrained at a trailing edge such that the show wings provide movements that give the illusion of moving and/or lift producing wings while, in practice, being relatively lift neutral (or at least providing more drag than vertical lift)
Figure 9:
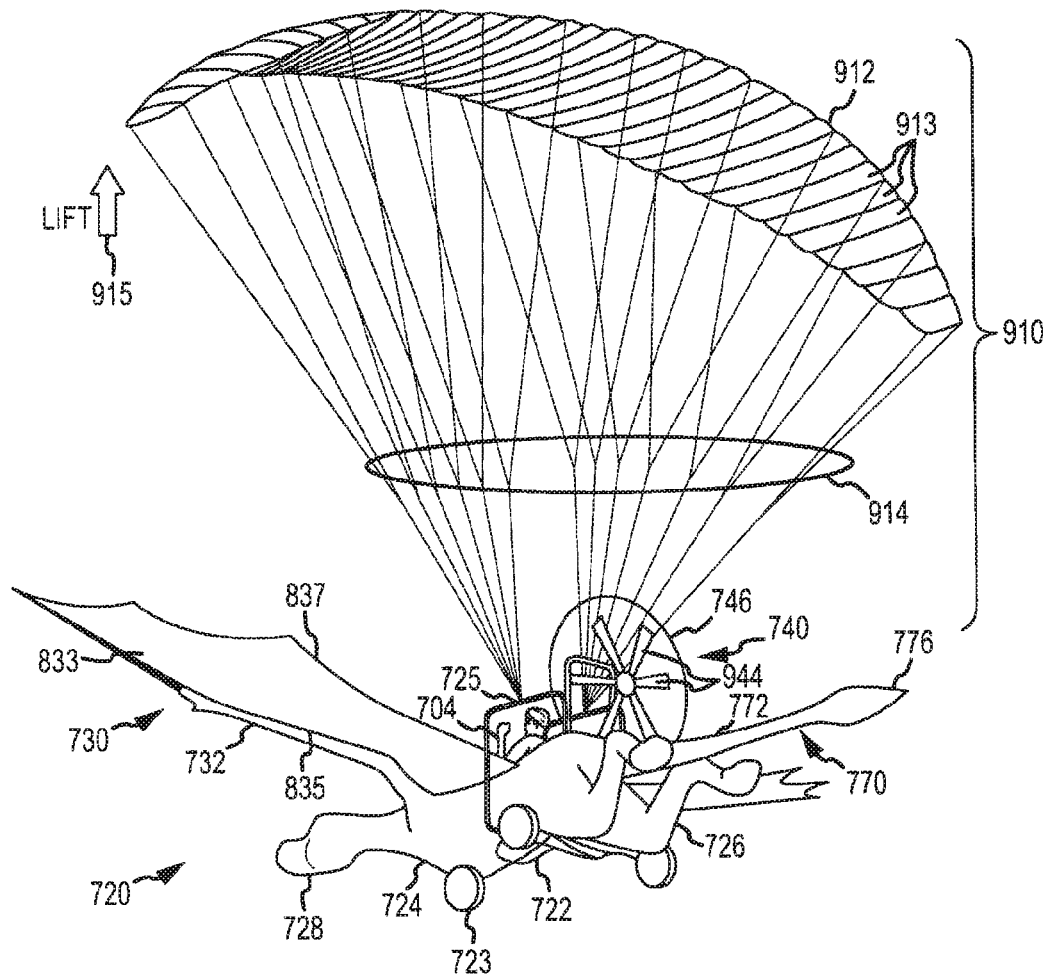
FIG. 9 illustrates a bottom, rear perspective view of a flying entertainment vehicle or platform including the vehicle assembly of FIGS. 7 and 8 and further including a lift assembly controllable via an operator positioned within a frame of the vehicle assembly (e.g., a cockpit provided by configuration of the vehicle frame but disguised by the inclusion of a covering or body (e.g., a body of a dragon in this example))

FIGS. 7-9 illustrate another embodiment of a vehicle assembly 720 that may be used with a lift system (e.g., a parawing or the like) 910 as discussed herein to provide a useful flying entertainment vehicle. In FIG. 7, the assembly 720 is shown to include a frame 722 with wheels 723 and a cockpit defined for a pilot 704. A hang/control point 725 on the frame 722 may be proximate (above) the seat for the pilot 704 to facilitate control of the lift system (e.g., to move control surfaces or the canopy of a parawing via control lines or risers), and the hang point 725 may be near or correspond to the center of gravity of the vehicle assembly 720. A thrust assembly 740 may be provided near the rear portion of the frame 722 (with propeller 944 shown in FIG. 9) including a prop guard cage 746 that operates to push air to create thrust (with prop wash ejected out the back or rear of the vehicle assembly 720 as shown at 808 in FIG. 8).

The vehicle assembly 720 includes a number of show elements including a torso or covering 724 over the vehicle frame 722 but from which the wheels 723 extend. The show elements also include legs 726 extending from the rear part of the body 724 and a neck and head 728 extending from the front part of the body 724. These may be static components or may be manually or animatronically puppeted features (e.g., be controllable or operable by the pilot 704 or by control devices provided within the body 724 or on frame 722). Such animation is shown with arrow 729 in FIG. 8, and the movement may be generally limited to side-to-side movements to limit changing lift characteristics of the assembly 720. The tip of the head 728 may be a distance, $L_1$, from the hang point/CG 725 such as in the range of about 100 to 150 inches in one embodiment.

Further the show elements may include a wing assembly 730, which in FIG. 7 is shown during initial fabrication to only include the forelimbs or leading edge members 732 extending outward from the sides of the body 724. In this embodiment, the tail assembly 770 is configured to be passively animated with a body 772 defined by an outer shell or sock/tube that extends from a first end 774 near the body 724 to a second end or tip 776 distal from the body 724. The first end 774 may have an opening 725 to receive prop wash or output air 808 from the thrust assembly 740, which acts to fill or inflate the body 772 and, in some cases, to cause the tail body to move as shown with arrows. The movement of the tail 772 may be relatively free (such as almost random appearing flapping of the tip 776 and parts of body 772) while in some embodiments mechanical linkages are provided to restrain movement of the body 772 and tip 776 in a single plane (e.g., a horizontal plane or plane parallel to a plane containing some or all of the wing assembly 730, for example). Further, dampeners may be included to control or restrain the speed of such tail movements (e.g., to cause movement to be relatively slow and avoid whipping actions that may be more disruptive to flight characteristics of vehicle assembly 720).

FIG. 8 shows the vehicle assembly 720 after the complete fabrication of the wing assembly 730 and showing the thrust assembly 740 in operation to output a volume of air 808 that inflates and animates the tail assembly 770 and that causes the vehicle assembly 720 to roll forward on wheels 723 (or to fly when lift assembly 910 is added as shown in FIG. 9). FIG. 8 also shows that the body 724 may include an opening 805 defining or providing access to a cockpit for pilot 704. As shown, the wing assembly 730 may include a flexible wing body or webbing 833 that is attached to the forelimb at its leading edge 835 and be configured to be free to move vertically at its trailing edges 837 as shown with arrows. Hence, air movement over the webbing 833 is allowed to lift up and push down portions of the trailing edge 837 so as to passively animate the wing assembly 730 so as to provide the function of attracting a viewer's eye and cause the wing assembly 730 to appear to provide lift to the vehicle assembly 720. However, the fact that the webbing 833 is able to move with the air forces acts to make the wing assembly relatively lift neutral (or at least minimally lift active during flight as the wing assembly 730 generally only provides parasitic drag). In some embodiments, the webbing or body 833 is merely rigidly attached at the forelimbs 732 via leading edge 835 while other embodiments may include one or more hinged or pivoting mounting devices that allow the webbing 833 and trailing edge to 837 to more readily move in response to forces applied by flowing air.

A flying entertainment vehicle is formed as shown in FIG. 9 by attaching a lift system or assembly 910 to the vehicle assembly 720. FIG. 9 shows the flying entertainment vehicle during flight with the propeller 944 of thrust assembly 740 providing the thrust (or flying speed) used to inflate cells 913 of a parawing 912 and create lift 915. The lift 915 is applied to the vehicle frame 922 via the suspension risers or flexible lines 914 at hang point 725. The pilot 704 may operate control lines 914 to move control surfaces of the canopy or parawing 912 to direct the vehicle assembly 720 in particular directions and to differing altitudes. During flight as shown, the tail body 772 is also inflated with prop wash from propeller 944 and is passively animated. Additionally, the flight causes the webbing 833 of the wing assembly 730 to move to animate the wing assembly 730 and provide a unique show element. As discussed above, the head 728 may be static or may be puppeted or animated by manual operation and/or via animatronic devices.

The parawing 912 of the lift system 910 may be disguised such as with coloring of the underside or lower surfaces to blend with the sky and/or to display show elements (e.g., a sign that appears to be pulled as a banner by the vehicle assembly 720). In some embodiments, a projector is provided in the body 724 or on frame 722 that is operated to project images (show elements) onto the parawing 912 that further creates a disguising effect or that provides a show feature. In other cases, light and/or images are projected onto the parawing 912 and/or vehicle assembly 720 via ground-based projectors or lighting equipment to disguise or change the appearance of these components.

Figure 10:
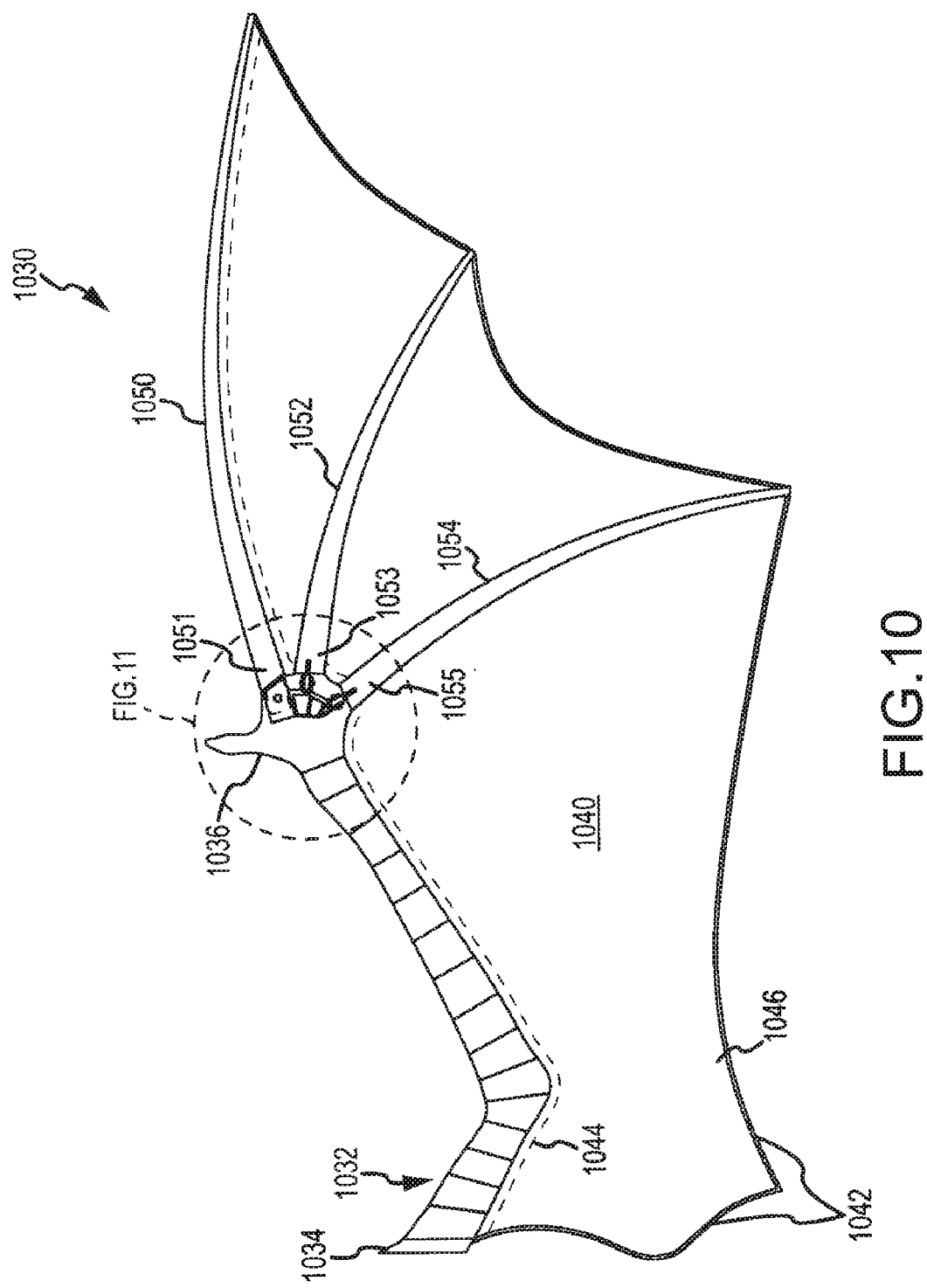
FIG. 10 illustrates one embodiment of a wing assembly 1030 that may be used as a show element of a flying entertainment vehicle.

FIG. 10 illustrates one embodiment of a wing assembly or wing 1030 that may be utilized in a flying entertainment vehicle to provide passive animation and be substantially lift neutral. To this end, the wing assembly 1030 includes an arm or forelimb 1320 that may be a substantially rigid member that may be mounted at a first or shoulder end 1034 to a vehicle body or frame and extend outward to a second or hand end 1036 (with or without the bend or elbow as shown in FIG. 10).

Figure 11:
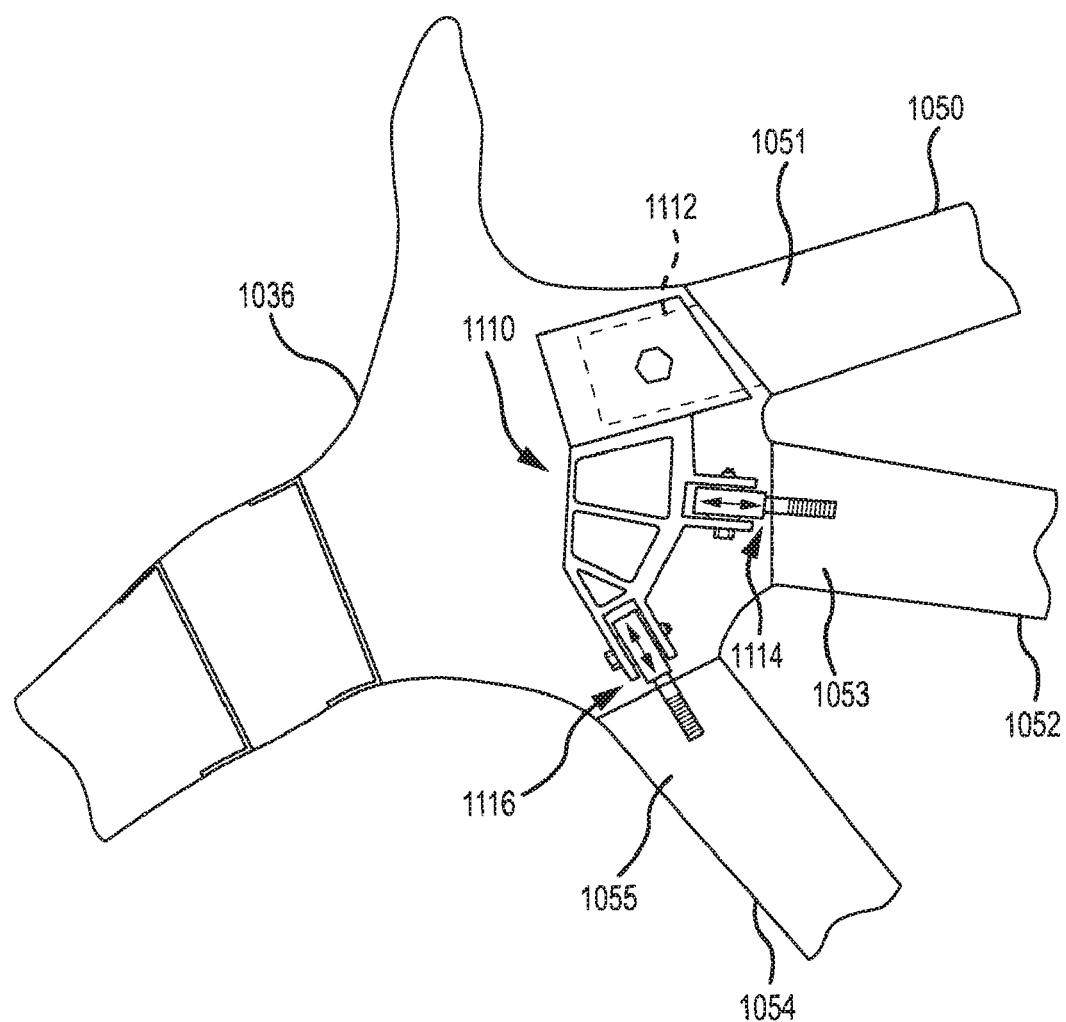
FIG. 11 provides an enlarged view of the finger connections in the wing assembly of FIG. 10.

The wing 1030 may include a number of fingers extending outward from the hand end 1036. As shown, the wing 1030 includes three fingers 1050, 1052, 1054 that are attached to or mounted at ends 1051, 1053, 1055 to the hand 1036. Each finger body may be straight or have some curvature or be arc in shape as shown. FIG. 11 shows an enlarged view of the connection of these ends 1051, 1053, 1055 to a hand 1036 via coupling structure 1110. As shown, the coupling 1112 used to restrain outer or first finger 1050 may be rigid or fixed such that this end 1051 of finger 1050 cannot pivot and finger 1050 may be thought of as extending arm or forelimb 1032 with a rigid, cantilevered limb (e.g., a metal, plastic, or similar material rod or tube). The couplings 1114, 1116 used to couple the ends 1053, 1055 to the hand 1036 and coupling structure 1110 may be pivotal components (e.g., ball bearings, ball joints, or the like) such that ends 1053, 1055 may pivot up and down (e.g., vertically relative to a plane containing the webbing or wing body 1040). Further to this end, the end 1053, 1055 may be spherical in shape such that a spherical recessed surface in hand 1036 may receive the ends 1053, 1055 to form a ball and socket configuration with coupling mechanisms 1114, 1116 controlling the direction of the rotation of ends 1053, 1055 relative to hand 1036 (transverse or perpendicular to a plane containing hand 1036).

The wing 1030 further includes a webbing or planar body 1040, e.g., a canvas or sheet of scrim material, fabric, or other material(s) that extends between fingers 1050, 1052, 1054. The webbing 1040 is also connected as shown by seam 1044 to the arm or forelimb 1032 at a leading edge. The trailing (and inner) edge 1046 of the webbing or wing body 1040 is defined by edge member(s) 1042 that may be made up of a tube and/or rod e.g., of metal tube and/or carbon fiber rod, to provide support of the trailing edge 1046 (e.g., to allow webbing 1040 to move up and down but not flutter or whip as much that may be unrealistic and cause undue wear such as fraying of webbing material). It is believed that the design of wing 1030 will prevent the wing 1030 from creating any appreciable lift (e.g., more drag than lift) as the webbing 1040 and fingers 1052, 1054 are free to follow the motion of air behind the arm 1032 and first/outer finger 1050 (e.g., to flap up and down or be passively, vertically animated).

Figure 12:
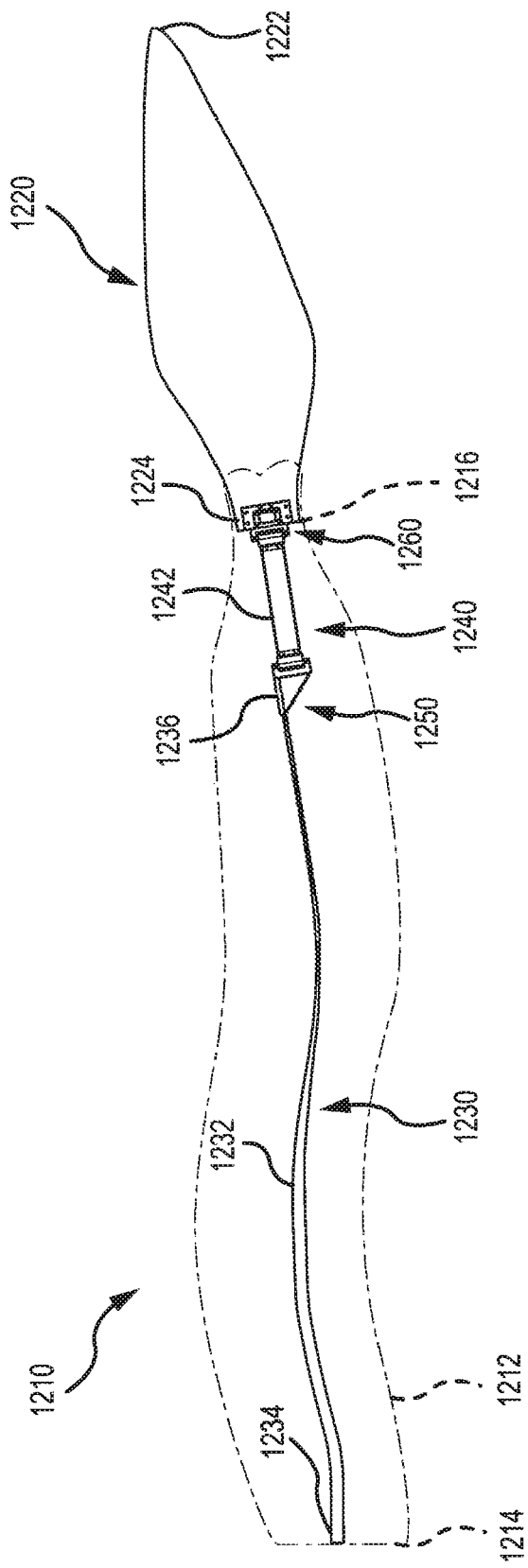
FIG. 12 illustrates a tail assembly of an embodiment showing the tail body ghosted to illustrate the internal support for the inflated tail body.

As discussed with reference to FIGS. 7-9 it may be useful to provide an inflatable tail assembly to provide passive animation of this show element. The body may be formed in a number of ways with varying internal support structures and components for restraining or controlling movement of the tail body and/or tail end or tip. For example, FIGS. 12-14B illustrate a tail assembly 1210 that may be used on a tailed creature in a flying entertainment platform of an embodiment of the invention. As shown in FIG. 12, the tail or tail assembly 1210 includes a tail body 1212, a tail tip or end 1220, and an internal support (and motion control) assembly 1230.

The tail body 1212 may be a flexible fabric tube or sock that extends from a first end 1214 to a second end 1216. The end 1214 would typically be open to facilitate inflation (such as via prop wash or flowing air when a vehicle is moving through the air), and the first or inner end 1214 may be connected to an end 1234 of a spring member 1232 (or assembly of spring members when more than one is used). The second end 1216 may be attached to an end 1224 of the tail tip or end 1220. In some embodiments, the ends 1214, 1216 are the only portions of the body 1212 connected to the internal support 1230 while other embodiments may call for the body 1212 to be connected continuously or at one or more points between the ends 1214, 1216 to the internal support 1230.

The tip or end 1220 may also be an inflatable, flexible component that extends from end 1224 to tip 1222. In other embodiments, though, the tail tip 1220 is provided as a body which may be solid in some cases or hollow, e.g., a bulbous or teardrop-shaped or spade-shaped shell with carbon fiber or other material walls to provide a lightweight, durable tip with its shape selected to suit the other show elements (e.g., to suit the particular character and their tail design).

To control movement of the body 1212 and tip 1220, the internal support 1230 is provided in the tail assembly 1210. In general, the internal support 1230 may be designed to allow side-to-side movement (e.g., provide life-like movement visible from the ground while providing little changes in vertical lift). In the illustrated embodiment 1210, the internal support 1230 includes an elongated spring member 1232 that extends from an end 1234 to an outboard end 1236. The spring member 1232 may extend a substantial portion of the length of the tail body 1212. It may be a leaf spring (e.g., a planar metallic spring member) with its thickness selected to dampen or allow more motion in response to air flow or forces of flowing air applied to the tail assembly 1210. For example, as shown, the leaf spring 1232 may have a thickness at end 1234 that is greater than the thickness at outboard end 1236, and the thickness may be generally two thicknesses or be tapered between the ends to suit a desired tail movement. The use of two thicknesses (or more) as shown dampens or limits movement near the tail base 1214 at end 1234 while allowing larger and/or more vertical (and twisting, in some cases) movements near end 1236 and tail tip 1220. The thicknesses and materials used may be chosen so as to provide a desired amount of tail movement (e.g., to set the spring constant along the length of the spring member 1232 and associated body 1212). Note, the use of the leaf spring for member 1232 generally limits or even prevents movement in the horizontal direction (or into and out of the plane of the paper) as the height of the member 1232 may be several inches while the thickness may be an inch or less.

Motion of the tail tip 1220 is further controlled by inclusion of tip mounting assembly 1240. The tip mounting assembly 1240 includes elongated body 1242 that is pivotally mounted at a first or inboard end to the spring member 1232 (or its outboard end 1236) via inner hinge assembly 1250. The body 1242 is further pivotally mounted at a second or outboard end to the end 1224 of the tail tip 1220 via outer hinge assembly 1260. Note, the hinge assemblies 1250, 1260 allow the tip 1220 to move up and down or into the plane of the paper while the spring member 1232 allows the body 1212 as well as tip 1220 to pivot in a transverse plane (e.g., the plane of the wing bodies or wing webbing). More generally, though, the hinges in assembly 1240 only allow the tip to move side-to-side.

Figure 13:
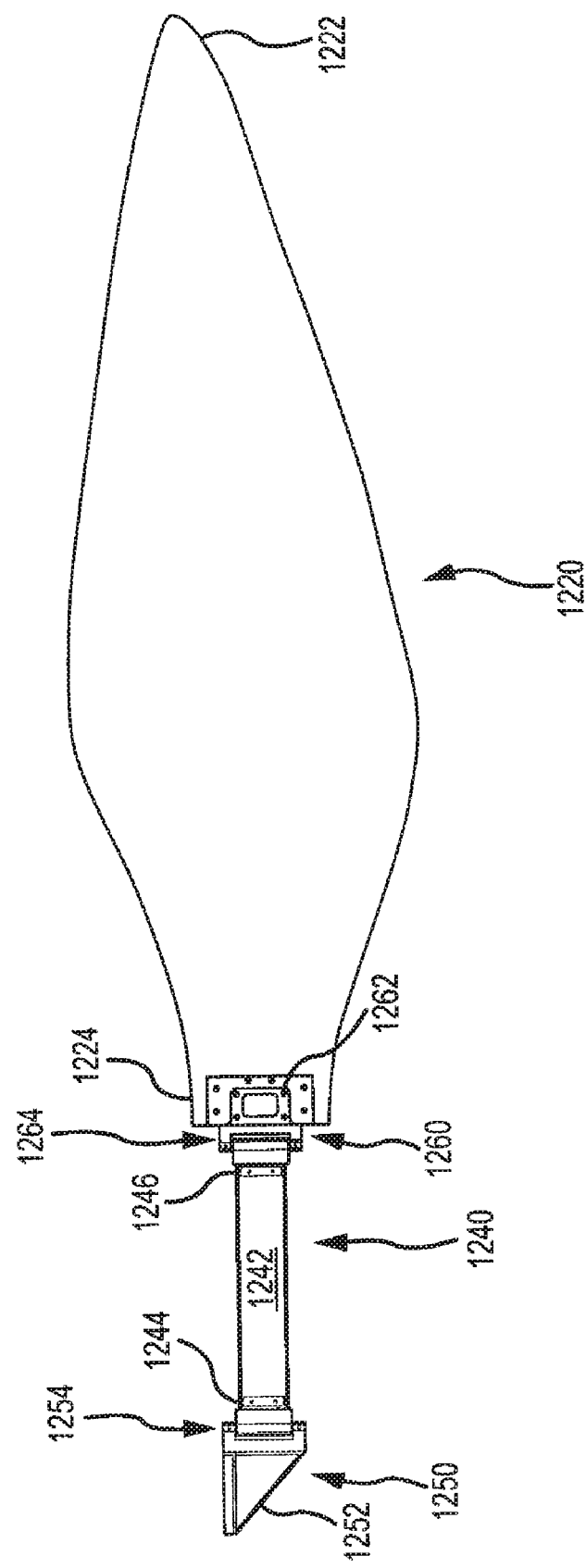
FIG. 13 shows an enlarged, detailed side view of the end or tip of the tail assembly of FIG. 12.

FIG. 13 illustrates further detail of these pivotal connections of the tip 1220 to the inner support structure 1230. As shown, the body 1242, which may be a fairly rigid tube (e.g., with a rectangular or other cross section) such as a carbon fiber rectangular tube, extends from an inboard or first end 1244 to an outboard or second end 1246, with the first end 1244 attached to the inner hinge assembly 1250 and the second end attached to the outer hinge assembly 1260. Also, while a single body 1242 is shown with hinged ends, the tip mounting assembly 1240 may readily be modified to include additional linked members and/or hinge pairs. For example, the body 1242 may be divided into two (or more) elongated bodies or links, and these two bodies/links may be connected at their mating or adjoining ends by a hinge mechanism (such as shown at 1260 to provide a limited range of motion from side-to-side). The use of two linked members may achieve a more sinusoidal motion and/or side-to-side motion.

Figure 14A:
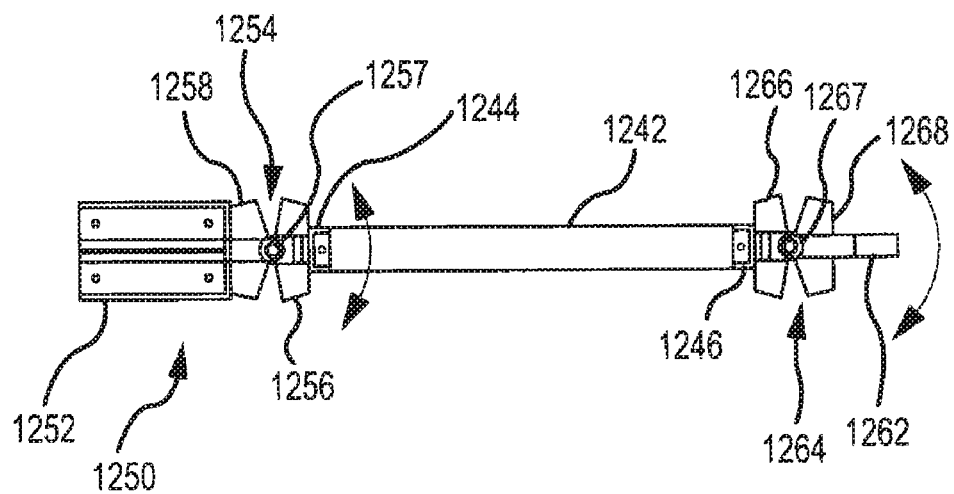
FIGS. 14A and 14B are top views of the hinged connections of the tail end or tip to the main body or spring member of the internal support of the tail assembly.
Figure 14B:
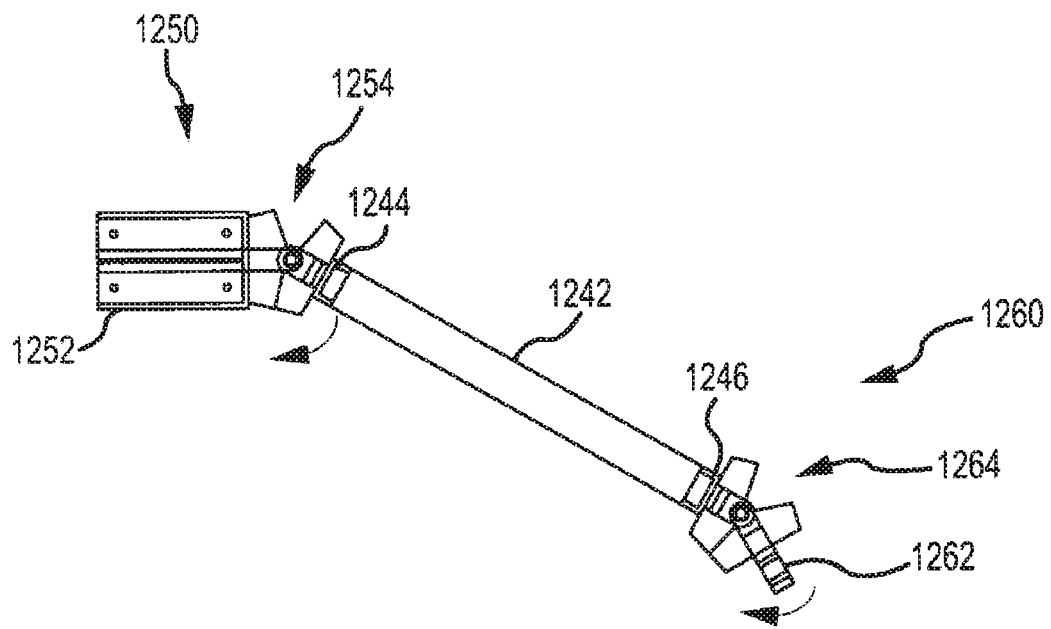

Specifically, as is also shown in FIGS. 14A and 14B, the inner hinge assembly 1250 includes mounting wall 1252 that is affixed to the end 1236 of spring member 1232. The inner hinge assembly 1250 further includes stop assembly 1254 attached to mounting wall 1252 and affixed to inboard end 1244 of the body 1242. The stop assembly 1254 includes spaced apart blocks 1256, 1258 and pin or pivotal mechanism 1257 that pivotally connects or links end 1244 to wall 1252. In some embodiments, soft bumpers may also be provided to dampen the impact. During use as shown with the arrows the wall 1242 is able to pivot in either direction about the axis of pin 1257 until the stops 1256, 1258 abut each other as is shown in FIG. 14B. As shown, the angular separation between surfaces of stops 1256, 1258 is limited to about 30 to 45 degrees but this may be varied to practice the invention and restrain or control movement of body 1242 relative to spring member 1232.

The outer hinge assembly 1260 is similarly configured to allow pivotal movement of the tip 1220 relative to the body 1242. To this end, the outer hinge assembly 1260 includes mounting wall 1262 to which stop 1268 is attached and stop 1266 is attached to end 1246 of body 1242. The body 1242 is pivotally attached via pin or pivot mechanism 1267 to the mounting wall 1262. Then, during use (flight), the tip 1220 is able to pivot in both directions about the axis of the pin 1267 until the surfaces of the stops 1266, 1268 abut or contact each other. The angle used to define the stop surfaces, again, defines the range of movement in either direction. This may be equal or different, and may be 15 to 30 degrees in either direction (e.g., the maximum separation as shown in FIG. 14B may range from about 30 to 60 degrees). Note, the pivoting motion of the body 1242 relative to the end 1236 of the spring member 1232 is independent of the motion of the tip 1220 relative to the body 1242.

From the above discussion, it can be appreciated that an aircraft is described that is designed to have an apparent lifting surface(s) that differs from the one that acts as the actual lifting surface (e.g., the parawing or the like). These apparent lifting surfaces may be part of the show elements described herein (such as wings, an animatronic head, tail, or other features, a passively animated feature such as a tail, and so on), which often will be configured and/or operated to be aerodynamically neutral or invisible. The operation of the components that can be moved or puppeted may be via control and actuation systems or devices provided in the vehicle frame or character/figure body, and the controls/control signals may be pilot-generated and/or show-based controls (stored in memory onboard or received from outboard show systems).

Each vehicle design typically will include a lift system providing a pre-engineered means/device(s) for providing lift to the spaced apart and, typically, suspended vehicle frame/body. In some cases, the lift system may include a parawing, a parachute, a parafoil (e.g., any nonrigid/textile airfoil with an aerodynamic cell structure that is inflated by ram-air that shapes it into a wing such as when towed behind a vehicle frame/body moving at takeoff/liftoff/flight speed(s)), or the like. Lift or aerodynamic force is provided by the pre-engineered devices as these devices provide significantly more lift than drag. Note, while lift may be in any direction, the description and claims is generally using the term "lift" to describe aerodynamic force that opposes gravity (or vertical lift).

Parasitic drag is generally referring to drag caused by moving a solid object through a fluid medium (e.g., gaseous medium such as air), and it may be made up of a number of components such as form drag, skin friction, and interference drag. With this in mind, the phrase "lift neutral" is intended to mean a component that provides significantly more drag than lift (with the drag value typically being a relatively constant parasitic drag during flight so as to minimize any changes to the flying characteristics or aerodynamic characteristics of the flying entertainment vehicle). Generally, the lift system provides substantially all of the lift for the vehicle (when the thrust assembly is ignored or excluded from the vehicle), and this may be quantified as 80 to 90 percent or more of the lift whereas in a conventional aircraft its wings provide substantially all the lift (e.g., are not non-lifting or lift neutral).

For example, the skin or cladding used on a body or covering provided over the vehicle frame may be aerodynamically neutral or non-lifting, and the show elements may also include wings that can be articulated passively or by powered movement (manually, pneumatically, and so on) but still are substantially lift neutral. For example, the wings may have their back or trailing edge free to move when the wing is pulled through the air. In another example, a tail may be provided that extends out the back of the vehicle frame (or a body covering such frame), and the tail may have constrained motion (such as in one plane or back and forth in a "horizontal" plane (e.g., parallel to the ground when the vehicle is on the ground)). The show elements may be articulated such as by a pilot or in a more automated way in response to show signals (or a scripted set of control signals), and these show elements may be integral with the vehicle body (i.e., no host aircraft provided).

In some embodiments, care is taken to try to hide or disguise the lifting surfaces such as the canopy of the parawing. This may be done by coloring lower or ground-facing surfaces of the parawing, e.g., dark colors such as black for night flights/shows, pink/salmon or blue for day shows, and so on. In some embodiments, the coloring may be dark gray for night uses and white, pink, light gray, and/or light blue for day uses. In some cases, the material used for the parawing is translucent. The parawing may be disguised in other ways such as by including show elements that make it appear to be a sign rather than a wing (e.g., add distracting components/features), which may cause an observer to think it does not function as a wing/lift surface (e.g., appears to be a banner towed behind vehicle frame). Other embodiments may call for projecting images and/or lights upon the lower surfaces of the parawing. In yet other cases, the parawing or portions of it may be mirrored to disguise its lifting purpose or change its appearance. In one embodiment, further show elements are provided to distract an observer from viewing or seeing the parawing or lifting system. These may include lights, smoke, pyrotechnic effects, carbon dioxide effects, and so on that may be emitted from the vehicle body. For example, the character built about the vehicle frame may be a dragon and the smoke, pyrotechnic effects, and/or lights may be output from the dragon's mouth, and then, the vehicle frame may be flown through these show elements.

Numerous components and devices may be used to provide the thrust assemblies and vehicle frames described herein for the flying entertainment vehicles. In some embodiments, the vehicle and thrust assembly may take the form of a powered paraglider/parawing tricycle or the like. In such embodiments, for example, a powered paraglider backpack motor unit (or similar motor or engine-driven propeller assembly) may be mounted on a three or four (or more) wheeled vehicle frame (e.g., tubular steel frame with a seat for a pilot). The vehicle frame may be foot or otherwise steerable by a pilot, and the frame typically will have attachment points for the paraglider wing (or parawing) via suspension and control/steering lines. The engine often will be a gas-powered engine with its size chosen to suit the propeller and size/weight of the vehicle and/or parawing (e.g., 100 to 500 or more cubic centimeter gas-powered engines or the like may be useful) while electric power plants may also be useful in some embodiments.

We claim:

1. An apparatus for use as a flying entertainment vehicle, comprising:
    a lift system inflated by air to generate lift;
    a vehicle frame attached to the lift system;
    a thrust assembly positioned on the vehicle frame, wherein the thrust assembly provides thrust that propels the vehicle frame at a flight speed to operate the lift system to generate the lift and wherein the vehicle frame is lifted into flight by the lift; and
    show elements supported by the vehicle frame, wherein the show elements are substantially lift neutral during the flight of the apparatus, wherein the show elements comprise a wing assembly including a pair of wing-simulating elements extending laterally outward from opposite sides of the vehicle frame, wherein each of the wing-simulating elements is configured to generate greater drag than lift at the flight speed when extended out from the vehicle frame and each of the wing-simulating elements comprises a webbing extending along a trailing edge of the wing, the trailing edge adapted to move vertically up and down in response to air flowing over the wing-simulating element during the flight, whereby the wing-simulating element remains substantially lift neutral.

2. The apparatus of claim 1, wherein each of the wing-simulating elements comprises a rigid arm defining a leading edge and said webbing extending from the arm to the trailing edge of the wing.

3. The apparatus of claim 2, wherein the wing-simulating elements each further comprises at least one finger extending from a first end to the arm to a second end proximate the trailing edge, wherein the first end is pivotally coupled to allow the at least one finger to move traverse to a plane passing through the arm, and wherein the webbing comprises a flexible sheet connected to the at least one finger to move relative to the arm with the at least one finger.

4. The apparatus of claim 3, wherein the wing-simulating element each further comprises a tubular support within the webbing extending along the trailing edge.

5. The apparatus of claim 1, wherein the show elements comprise a tail extending from a rear portion of the vehicle frame and wherein the tail comprises an elongated, hollow body formed of a flexible material that is inflated by air output from the thrust assembly.

6. The apparatus of claim 1, wherein the show elements comprise a tail assembly comprising an elongated hollow body extending from the vehicle to a tip element and wherein the tail assembly further comprises an internal support including a spring member extending a length of and supporting the body such that the body is constrained to move back and forth within a single plane in response to air flowing over the body during the flight.

7. The apparatus of claim 6, wherein the internal support further comprises a pivotal connection assembly linked to the spring member and the tip element and wherein the pivotal connection assembly pivotally supports the tip element allowing the tip element to pivot in response to air flowing over the tip or in response to movements of the spring member.

8. The apparatus of claim 1, wherein the lift system comprises a parawing connected to the vehicle frame via a number of suspension lines and controllable via a number control lines extending to the vehicle frame, whereby the vehicle frame and the show elements are spaced apart a distance from the parawing and are lifted into flight when the parawing is inflated with air.

9. The apparatus of claim 8, further comprising a projector projecting onto an underside of the parawing during the flight.

10. The apparatus of claim 8, wherein the parawing has a visual appearance, from an observer beneath the parawing during the flight, that disguises the parawing is operating to generate the lift, the visual appearance selected to match appearance, to the observer, of the sky behind the parawing.

11. A flying entertainment platform, comprising: a vehicle assembly including:
  a structural frame defining a cockpit for receiving a pilot;
  a thrust assembly operable to move the frame at a flight speed; and
  a number of show elements including a body covering a portion of the frame and a pair of wing-simulating elements extending laterally outward from the body, the wing-simulating elements being configured to provide parasitic drag on the frame when the frame is moved at the flight speed; and
  a parafoil attached to the frame via a number of flexible suspension lines, wherein the parafoil is inflated with air when towed by the vehicle assembly at the flight speed so as to generate lift to suspend the vehicle assembly above the ground,
  wherein each of the wing-simulating elements includes an arm defining a leading edge and a flexible webbing extending from the arm to a trailing edge of the wing-simulating element, the trailing edge moving vertically UP and down in response to air flowing over the wing-simulating element such that the wing-simulating element is substantially non-lifting when the vehicle assembly moves at the flight speed.

12. The platform of claim 11, wherein each of the wings further comprises spaced apart fingers pivotally mounted to the arm and connected to the webbing, whereby the webbing is structurally supported and allowed to move transverse to a plane extending through the wing.

13. The platform of claim 11, wherein the show elements comprise a tail with a tubular fabric body that is inflated at least in part by air output from the thrust assembly and wherein the tail includes an internal support that constrains movement to a side-to-side movement within a plane, the side-to-side movement having a predefined range and rate.

14. The platform of claim 11, wherein the show elements comprise animatronic components extending outward from the body and wherein the animatronic components are configured to be substantially lift neutral when the vehicle assembly moves through air at the flight speed.

15. A flying entertainment vehicle, comprising:
  a vehicle body;
  an aerodynamic lift system coupled to the vehicle body and generating lift when towed by the vehicle body, the lift system comprising control surfaces operable to controllably direct the vehicle body and affect the lift;
  control systems operable from the vehicle body and coupled to the aerodynamic lift system to control the control surfaces; and
  visually perceptible show elements coupled to the vehicle body and operable during flight created by the lift to draw a line of sight of an observer to the vehicle body, wherein the show elements comprise a wing assembly including a pair of wing-simulating elements extending laterally outward from opposite sides of the vehicle body, wherein the show elements extend outward from the vehicle body a distance greater than a length of the vehicle body and the show elements generate drag while being lift neutral, and each of the wing-simulating elements comprises a webbing extending along a trailing edge of the wing, the trailing edge adapted to move vertically up and down in response to air flowing over the wing-simulating element during the flight, whereby the wing-simulating element remains substantially lift neutral.

16. The vehicle of claim 15, wherein the show elements move with respect to the vehicle body in a manner that controllable maintains aerodynamic stability of the flying entertainment vehicle.

17. The vehicle of claim 15, wherein the show elements further comprise elements that alter appearance of at least a portion of the aerodynamic lift system.

18. The vehicle of claim 17, wherein the aerodynamic lift system comprises a parafoil attached to the vehicle body via a number of risers, whereby the vehicle body and show elements are spaced apart a distance from the parafoil.

19. The vehicle of claim 15, wherein the control systems operate independently to receive show commands and piloting commands from a pilot positioned within the vehicle body, wherein the piloting commands affect a direction of the flying entertainment vehicle and the lift generated and the show commands affect the visually perceptible show elements, and wherein the control system combines the piloting and show control commands to manipulate the aerodynamic lift system and show elements cooperatively so as to implement the show commands without adversely affecting aerodynamic stability of the flying entertainment vehicle.

* * * * *